June 19, 1962     J. SIMPSON     3,039,368
MILK CARTON ASSEMBLING MACHINE
Filed Oct. 21, 1958     24 Sheets-Sheet 2
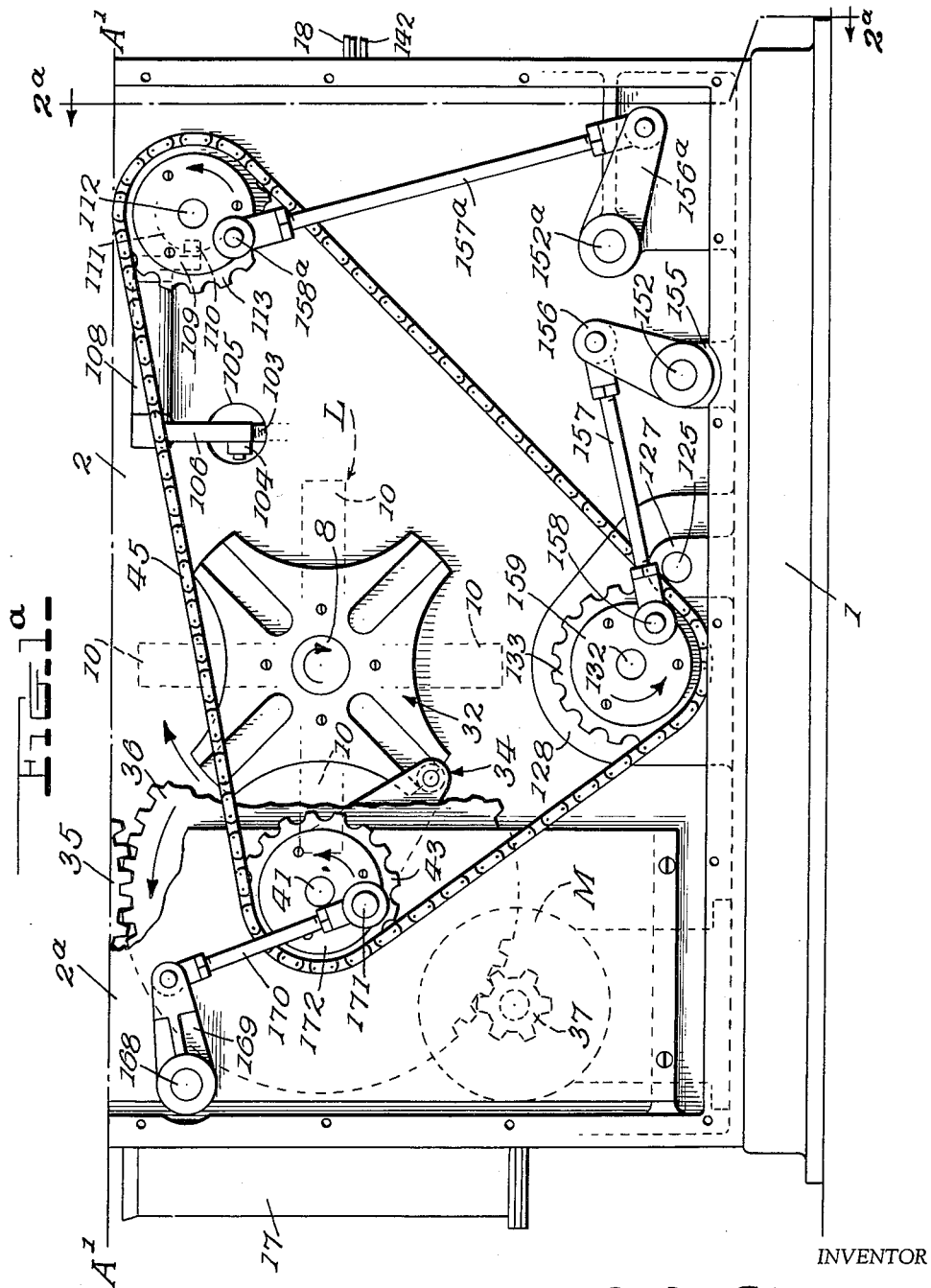
INVENTOR
Justin Simpson

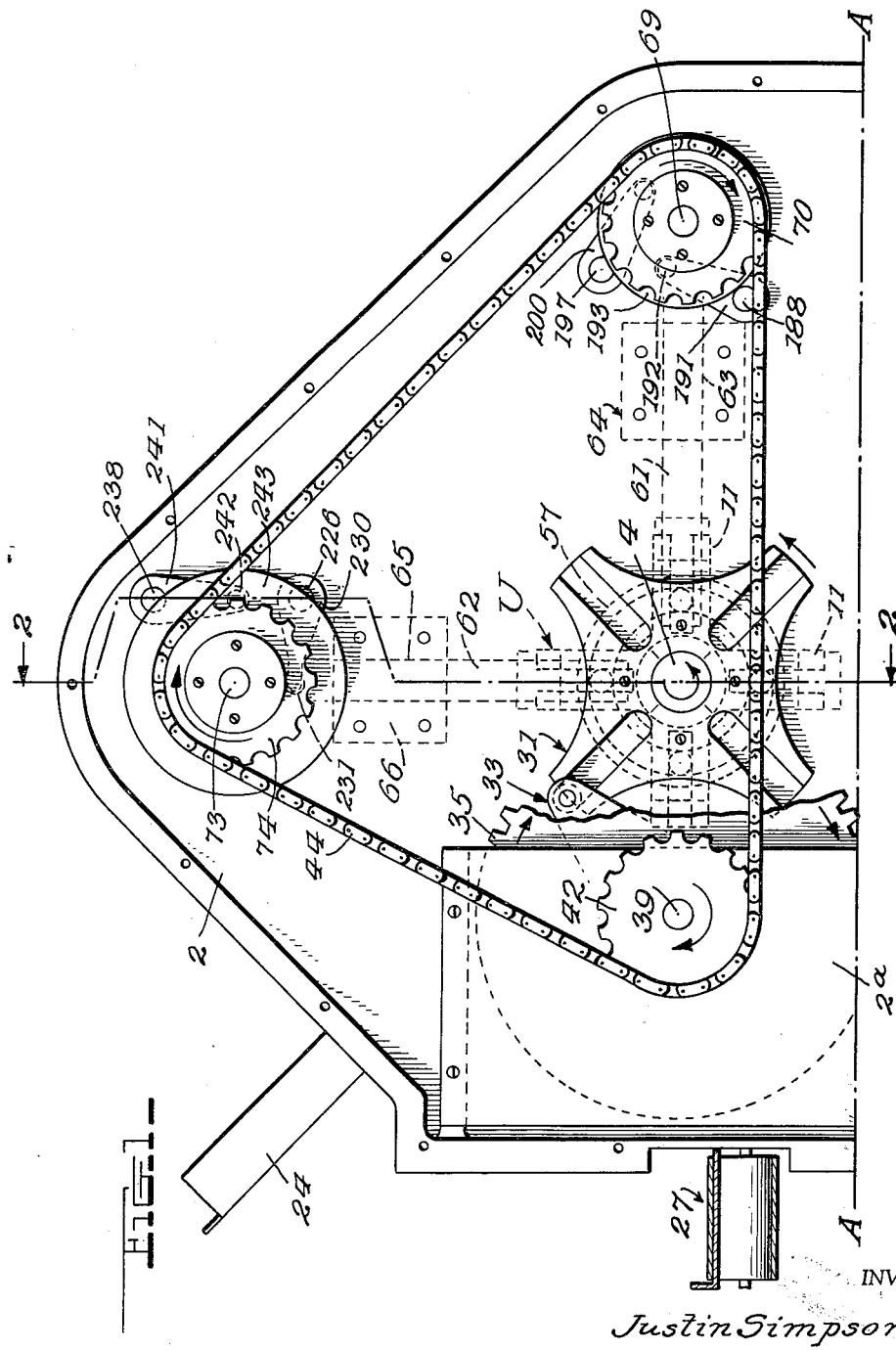

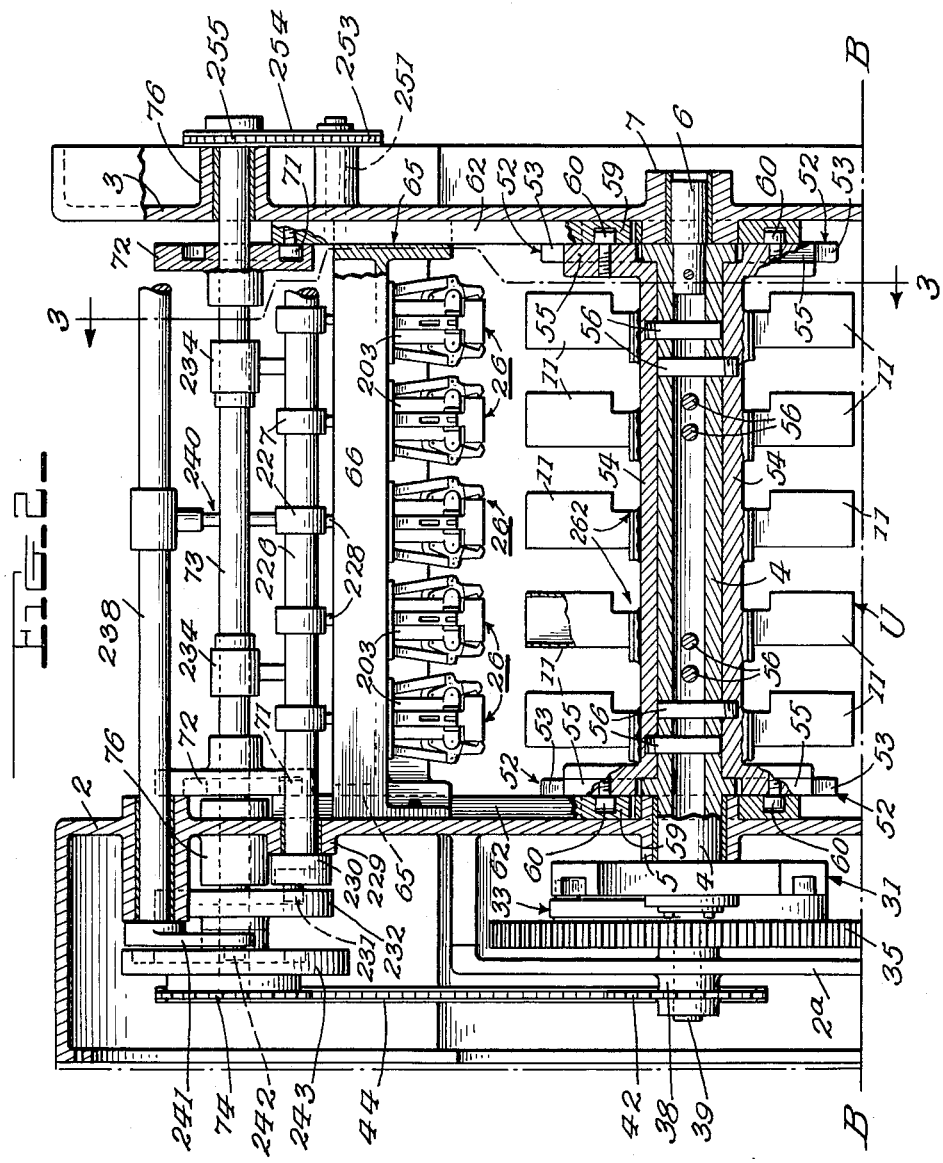

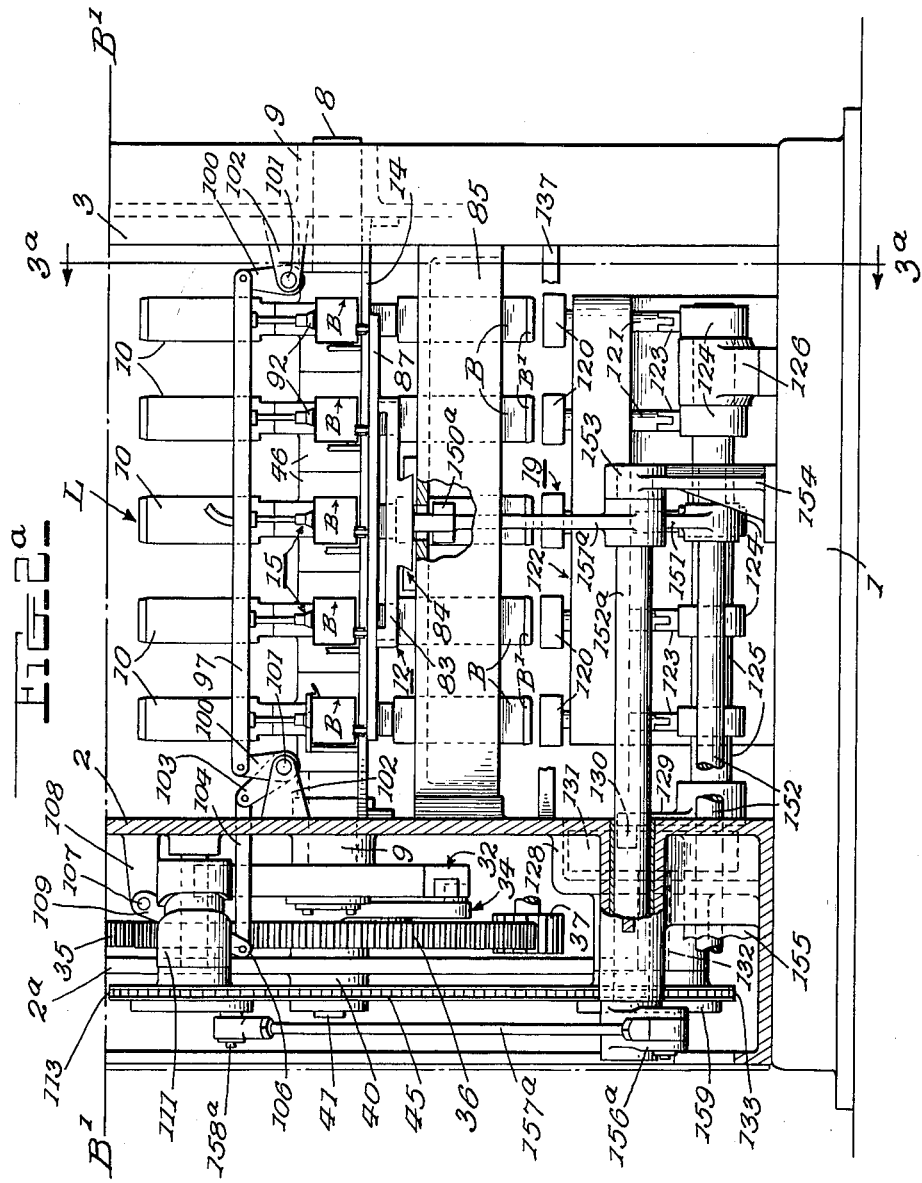

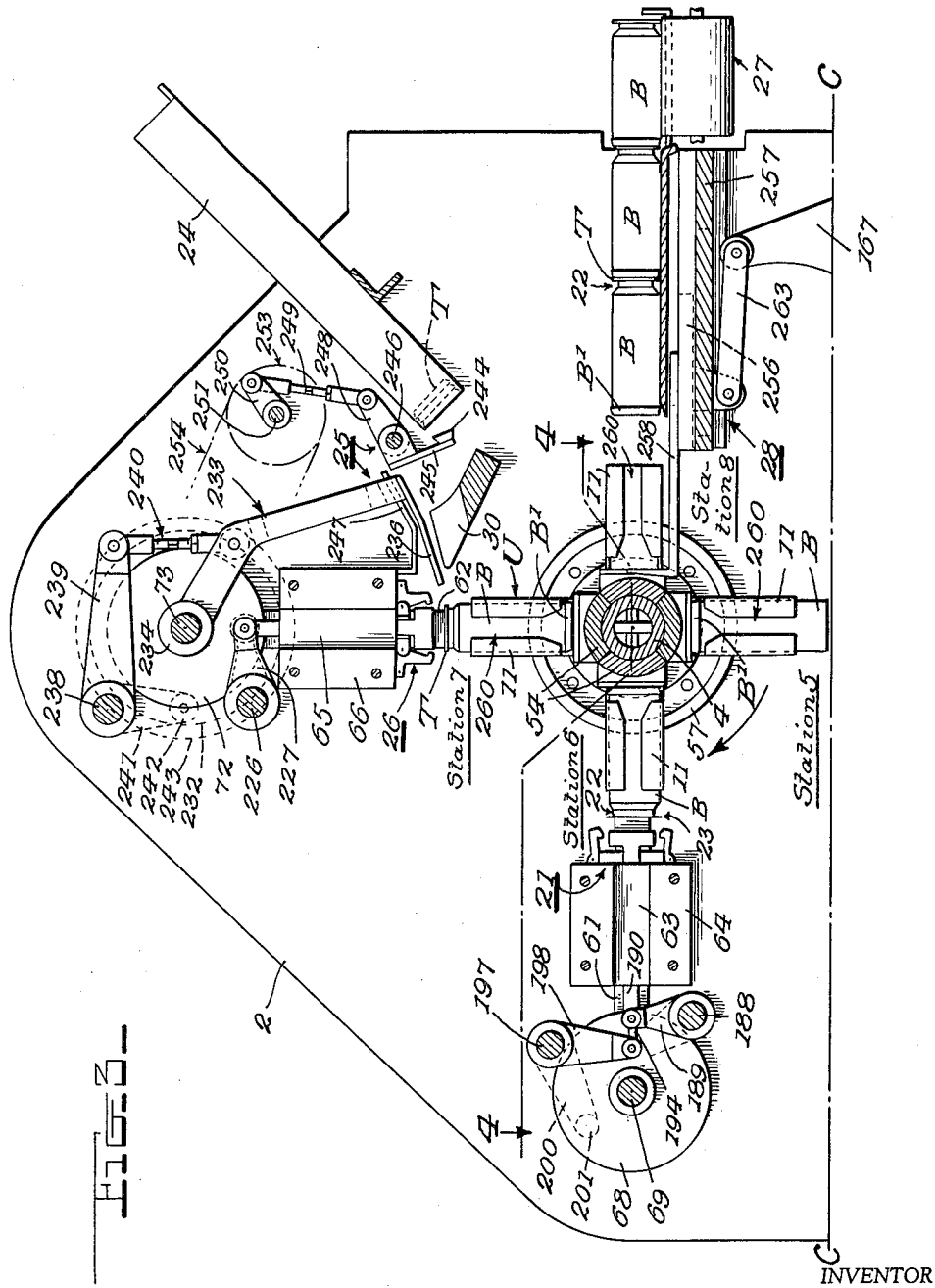

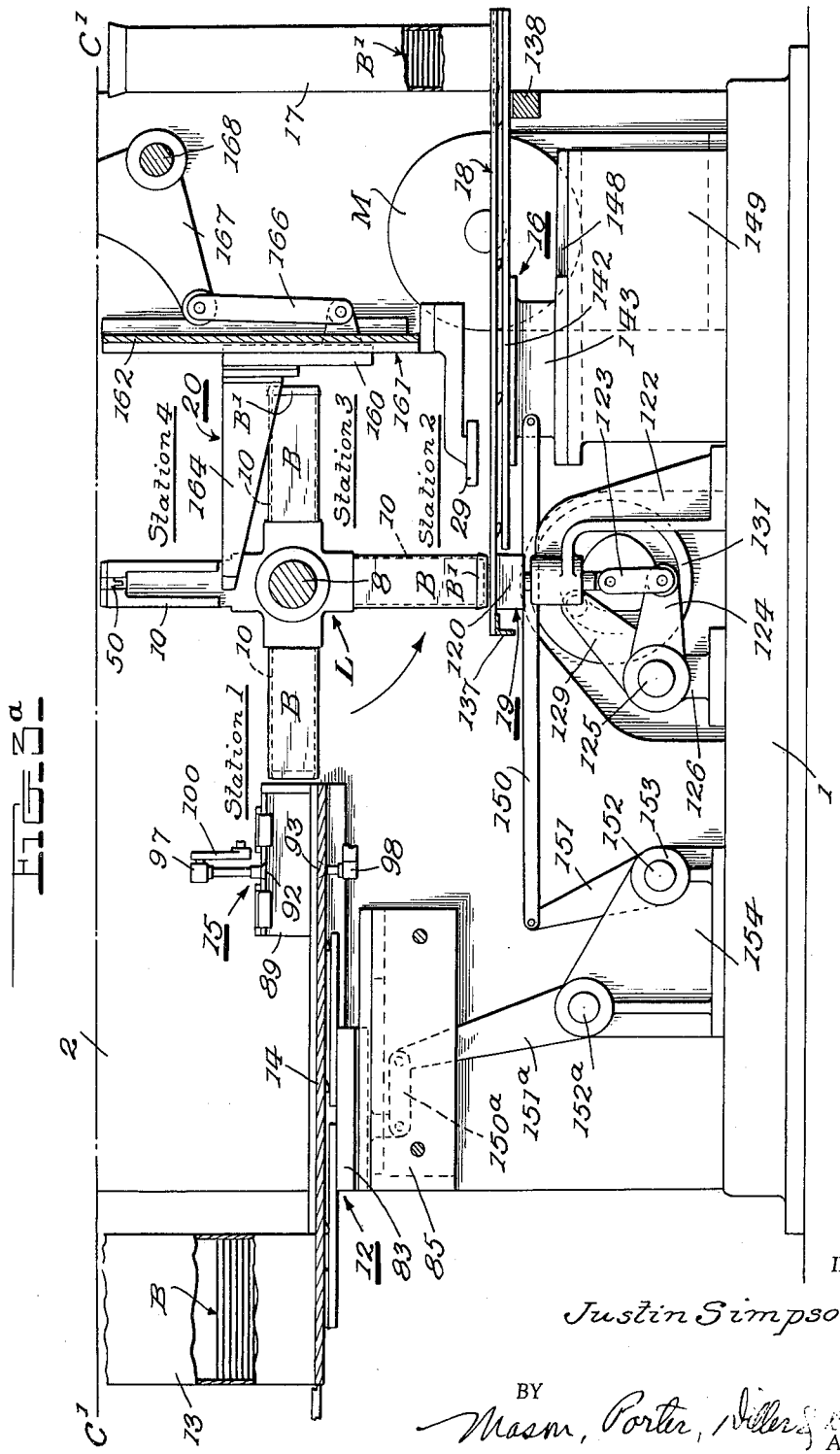

June 19, 1962 J. SIMPSON 3,039,368
MILK CARTON ASSEMBLING MACHINE
Filed Oct. 21, 1958 24 Sheets-Sheet 7
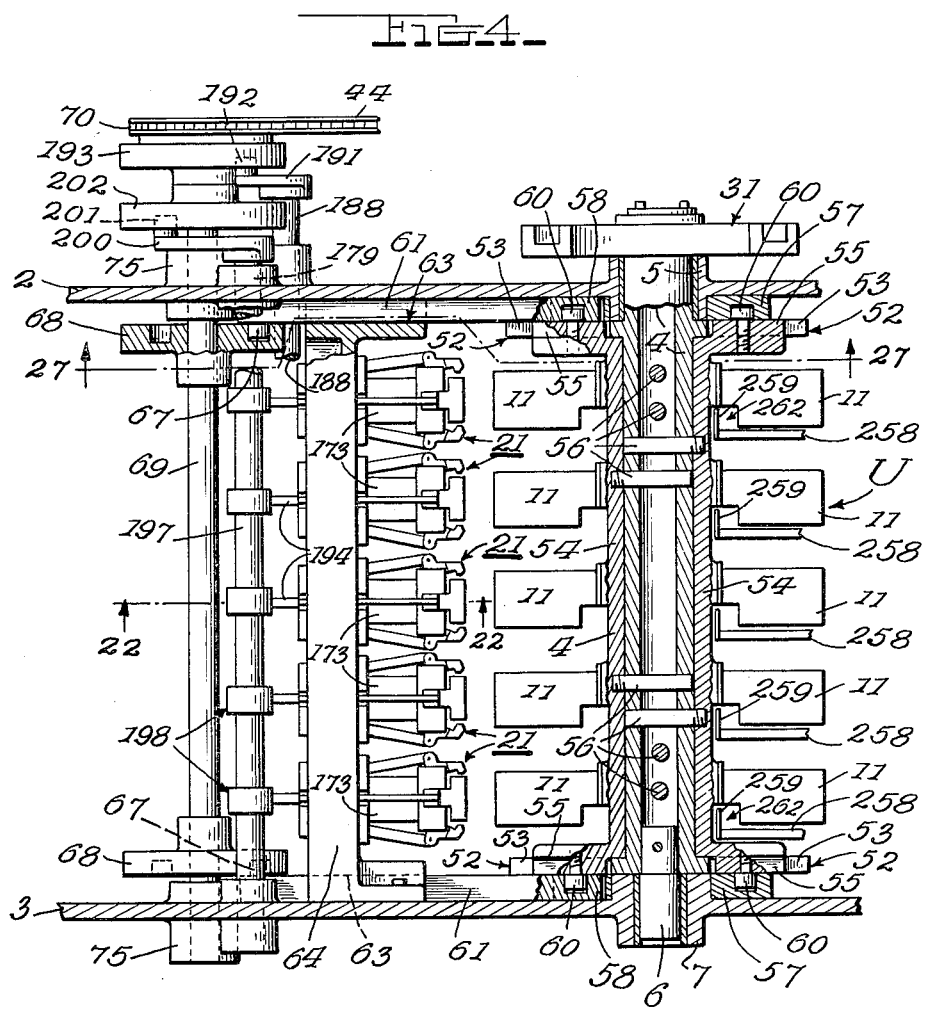
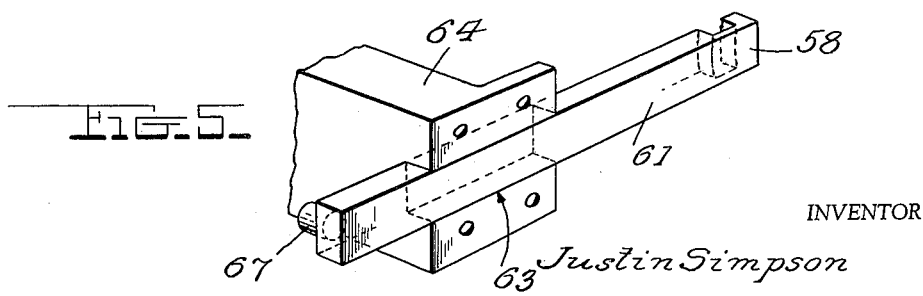
INVENTOR
Justin Simpson
BY
Mason, Porter, Diller & Stewart
ATTORNEYS

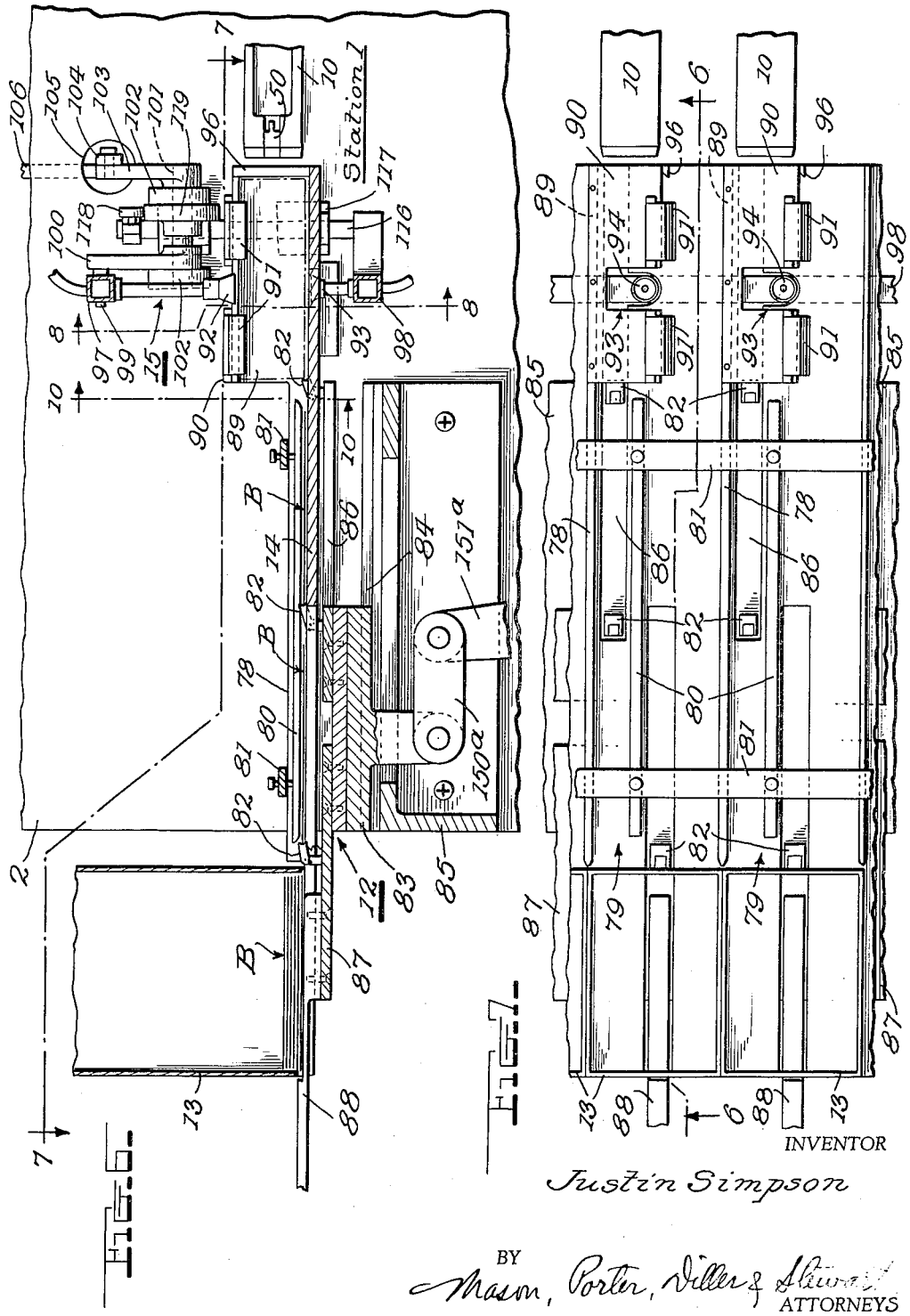

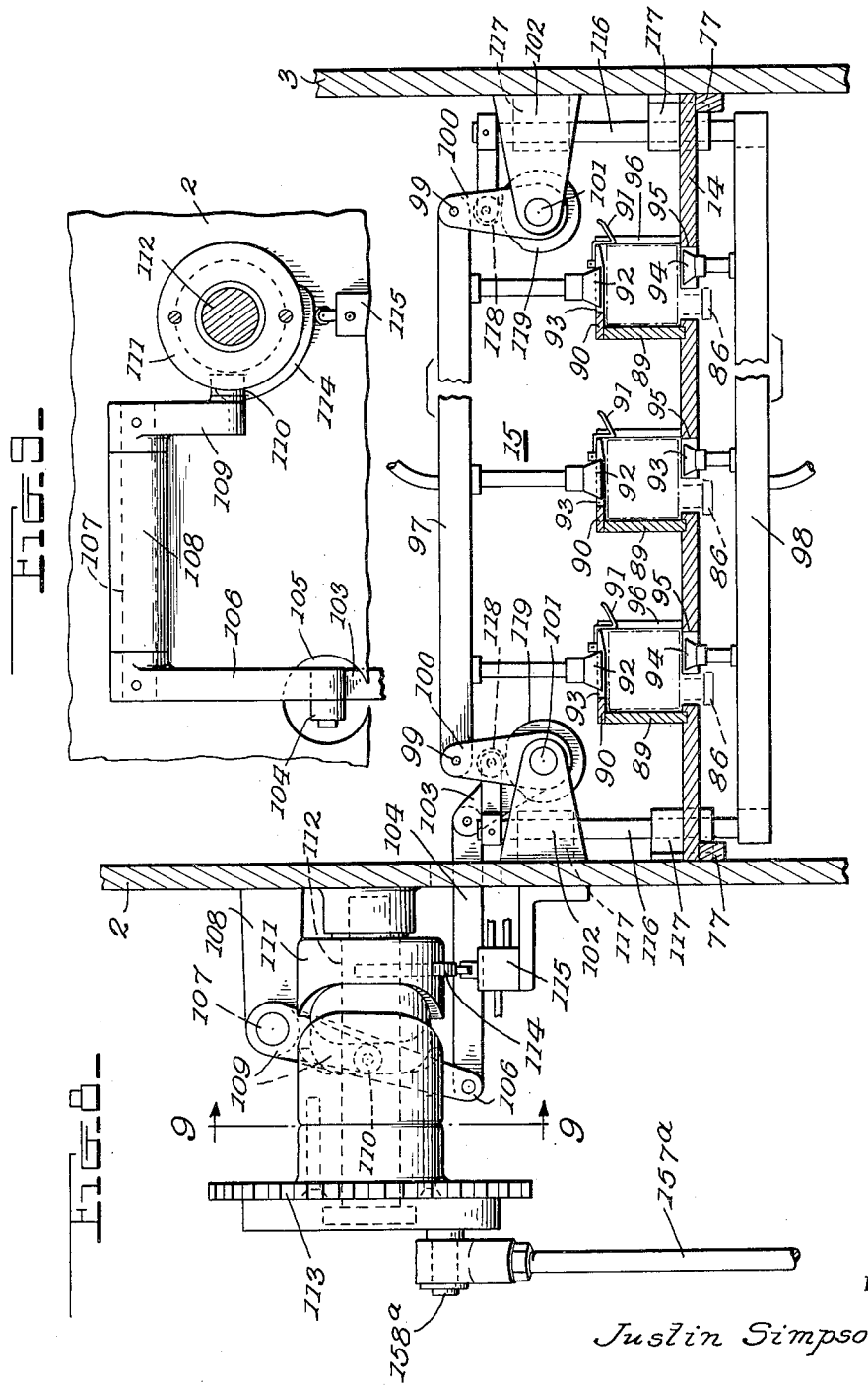

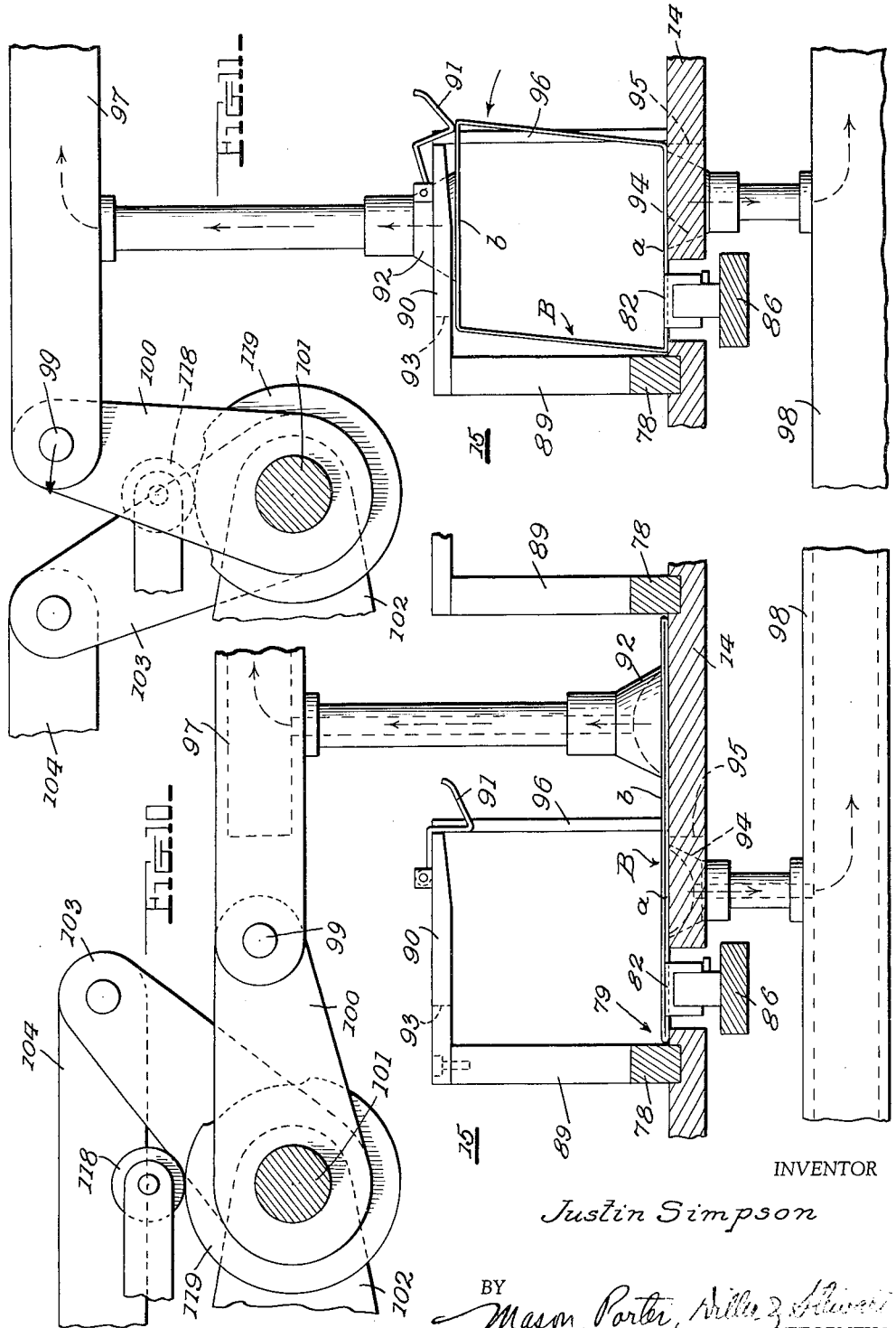

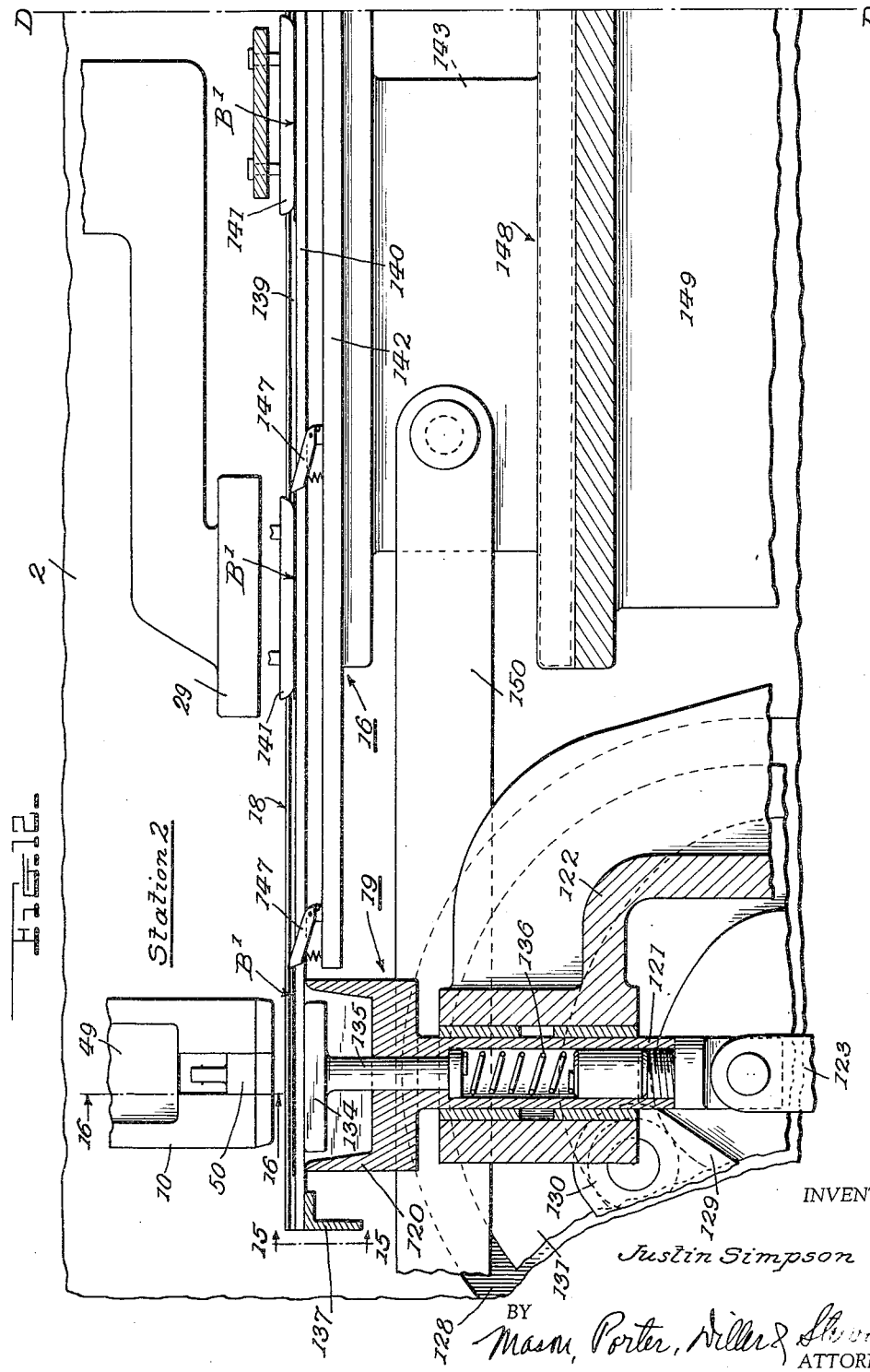

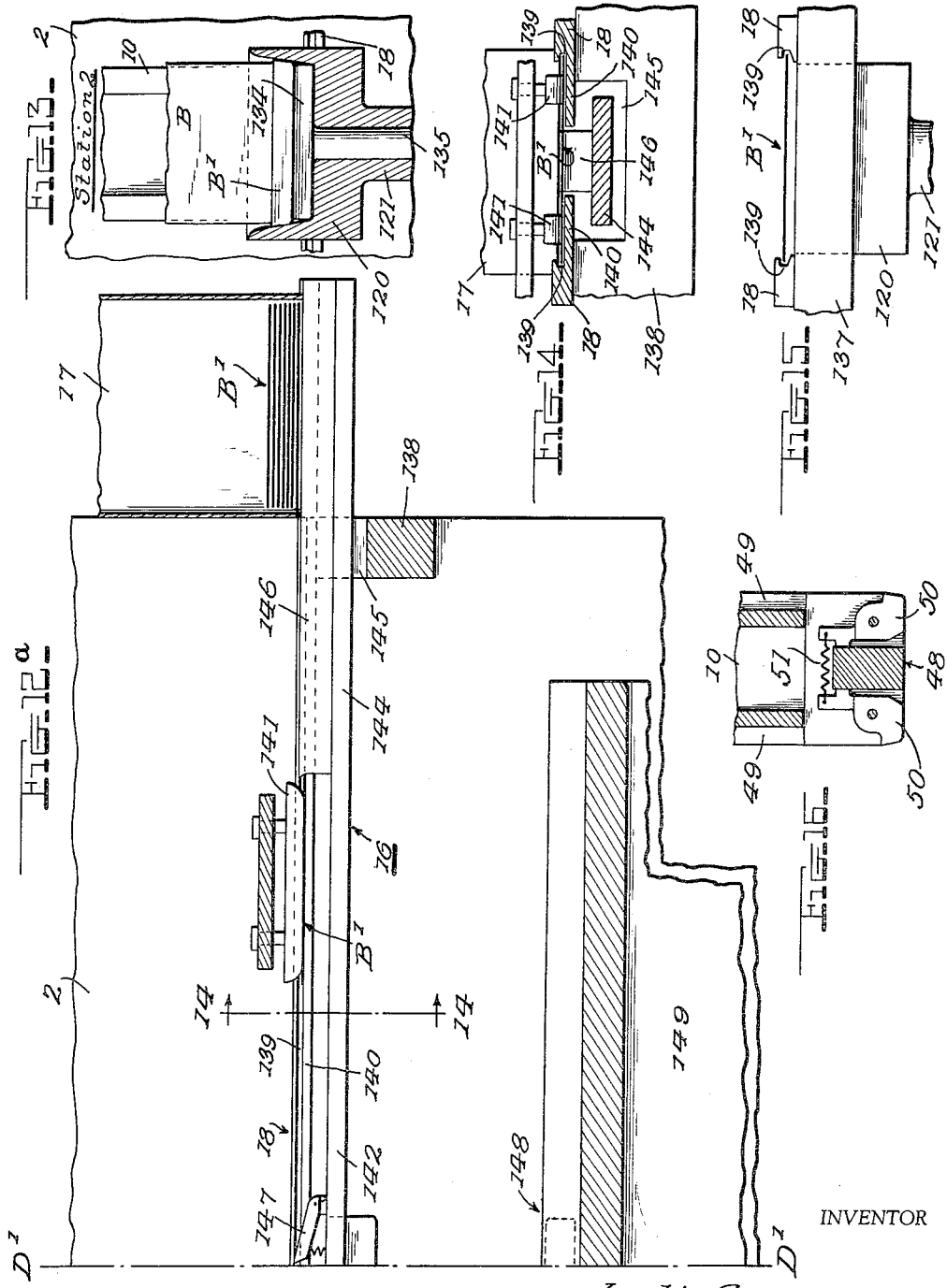

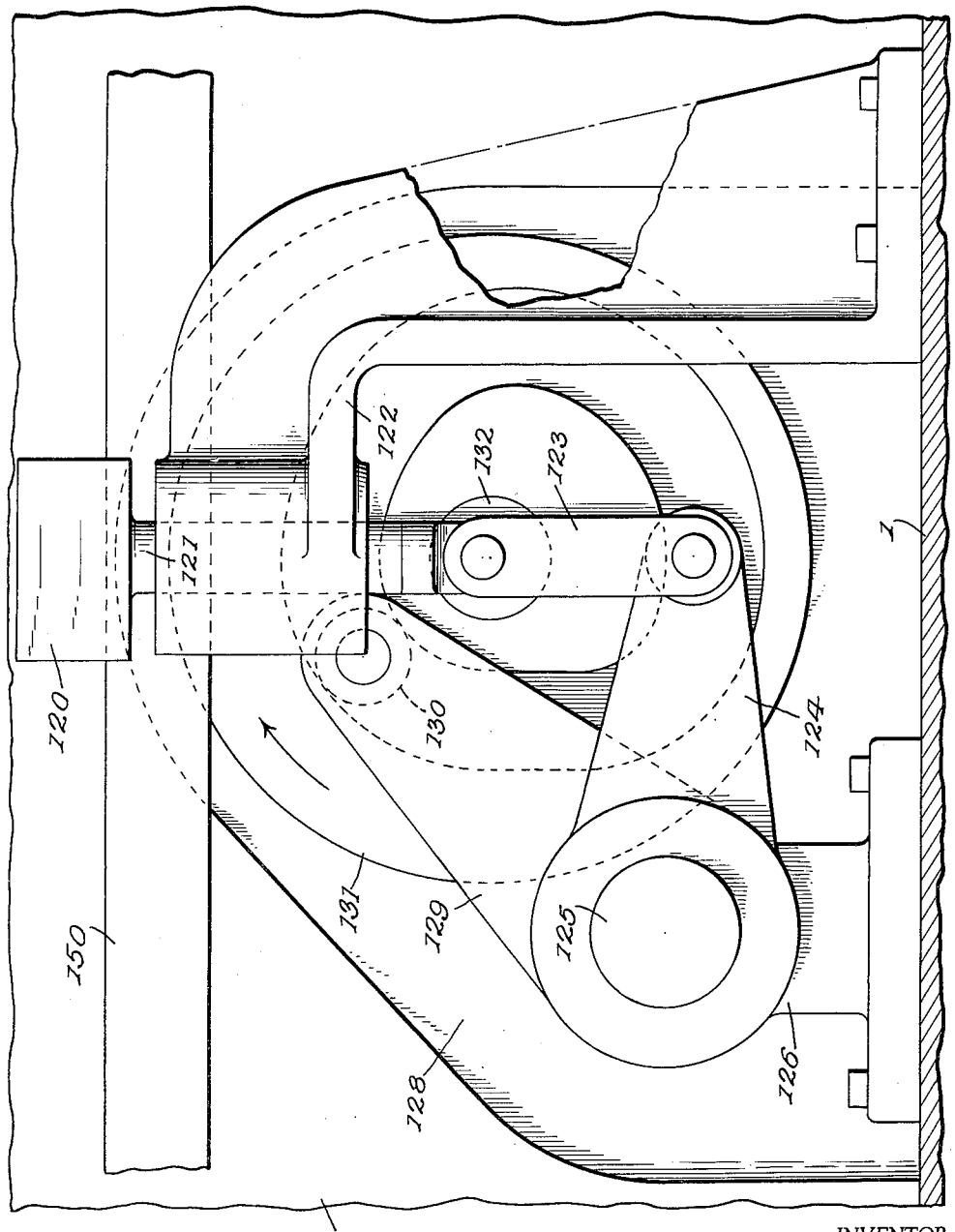

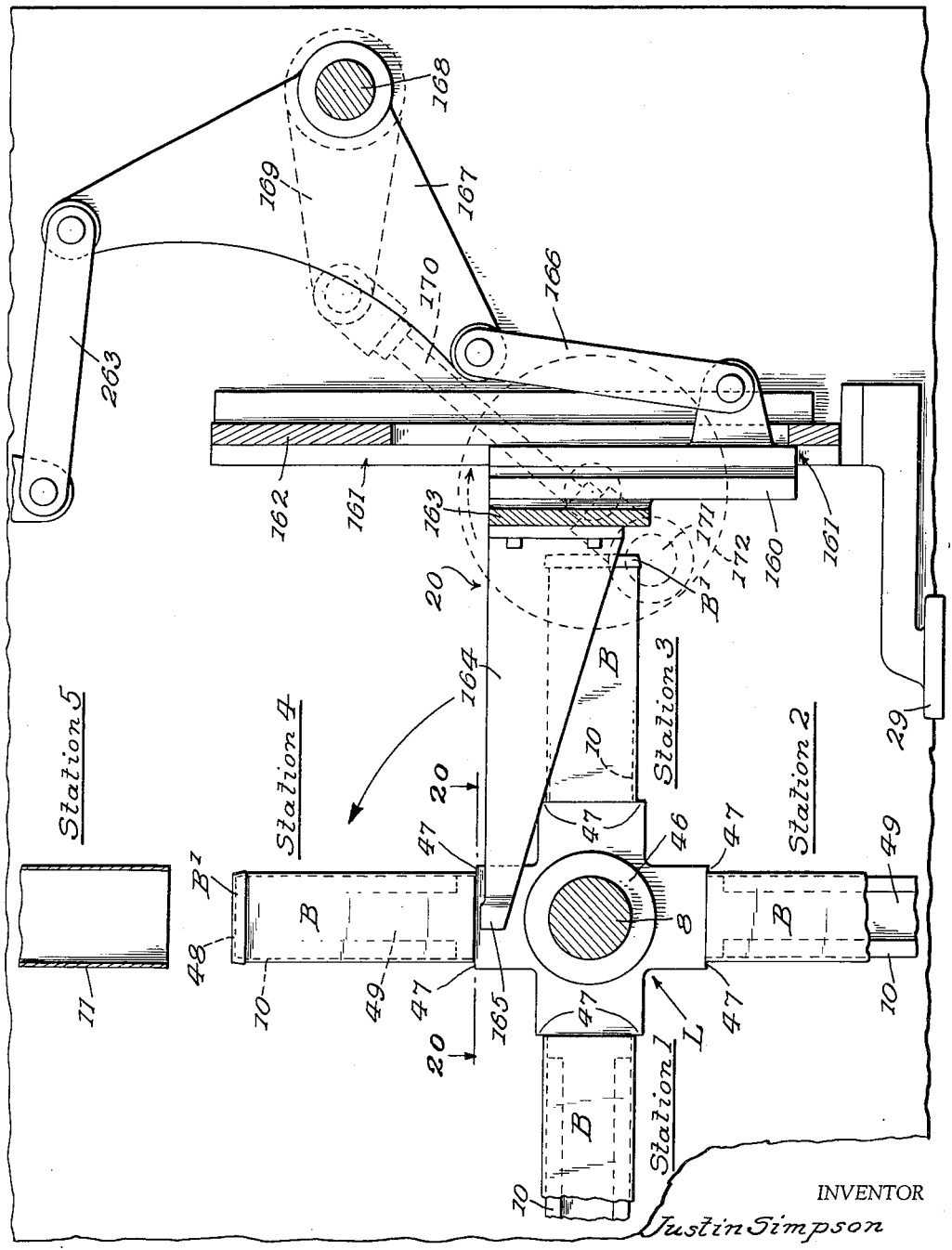

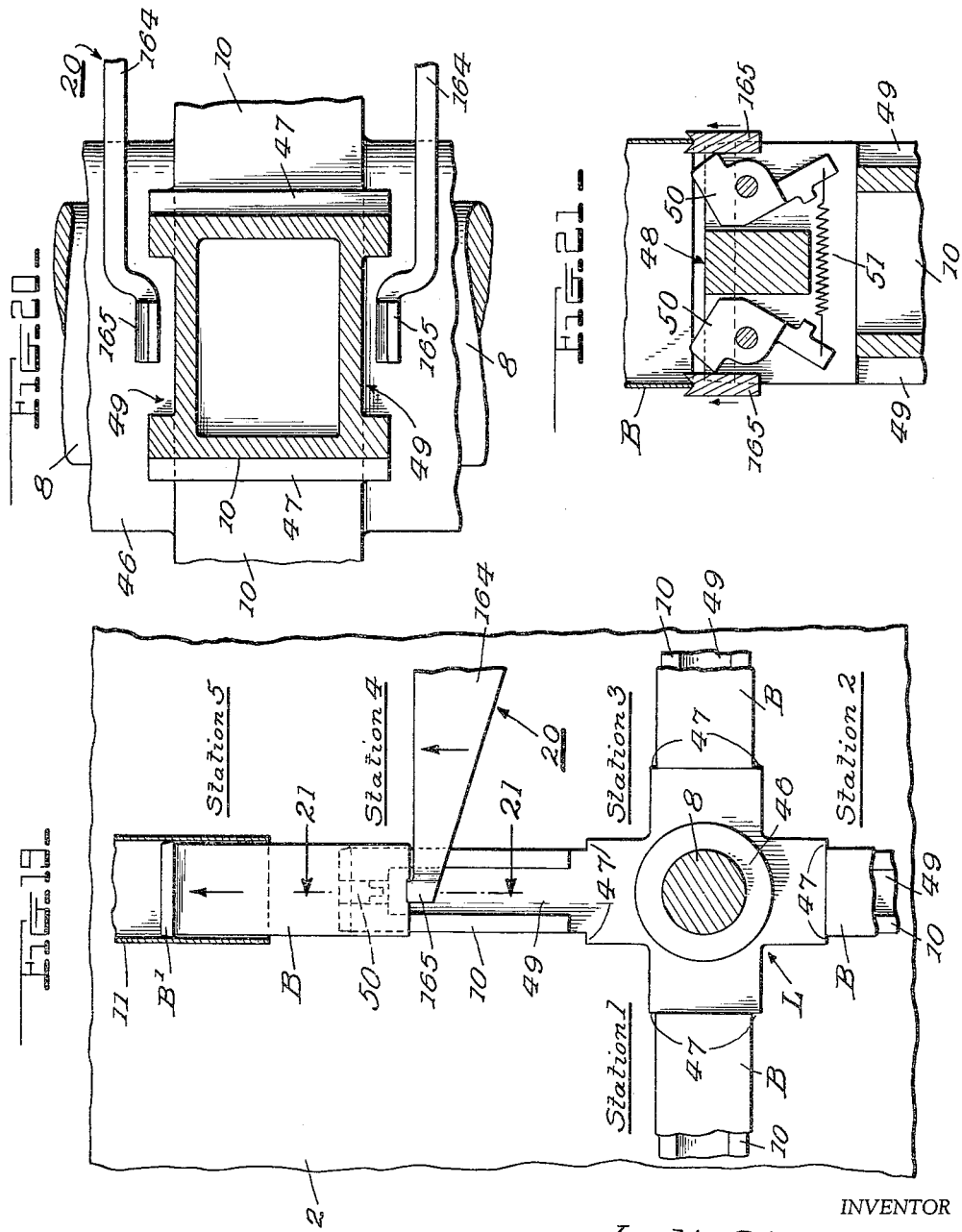

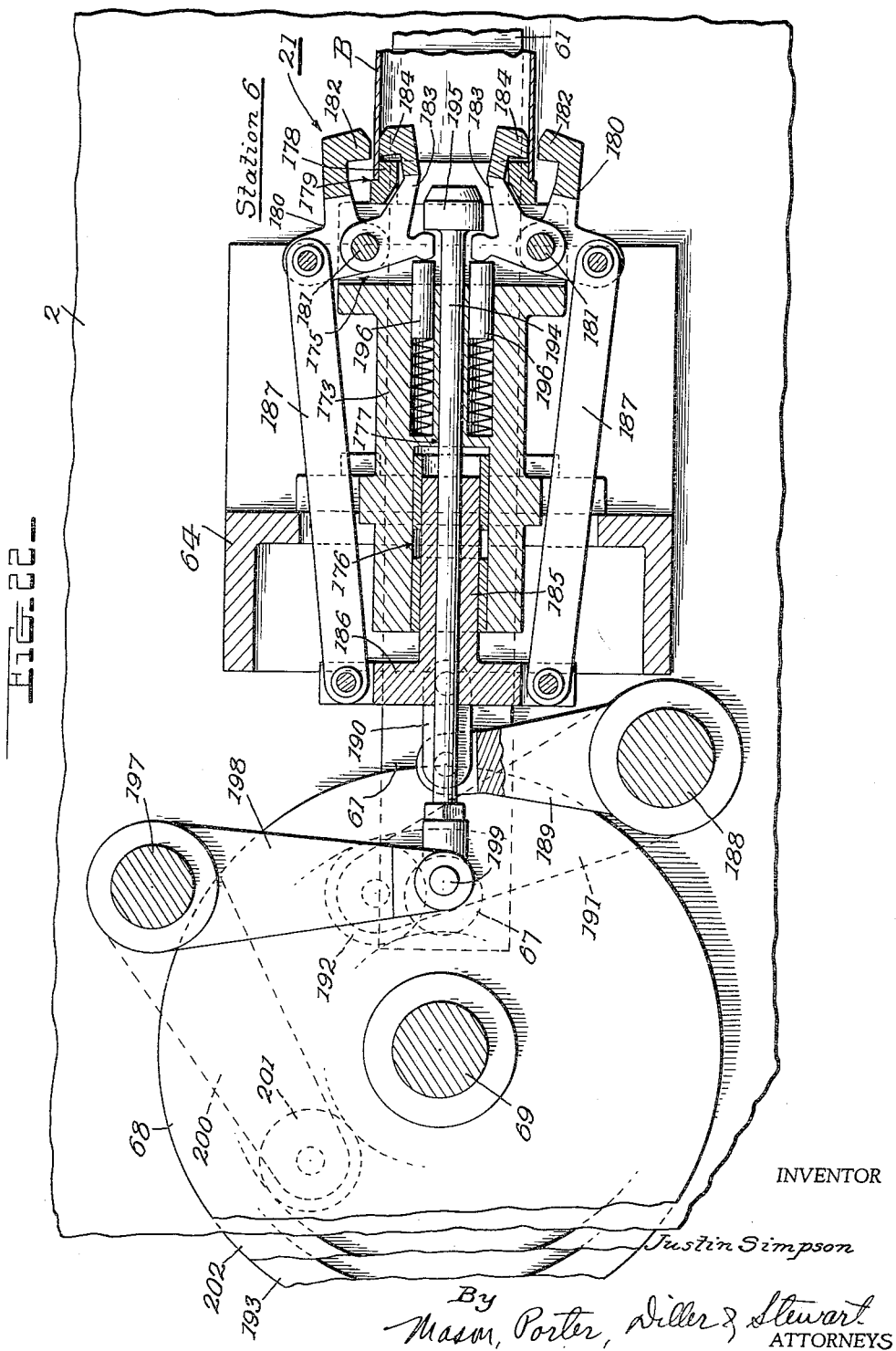

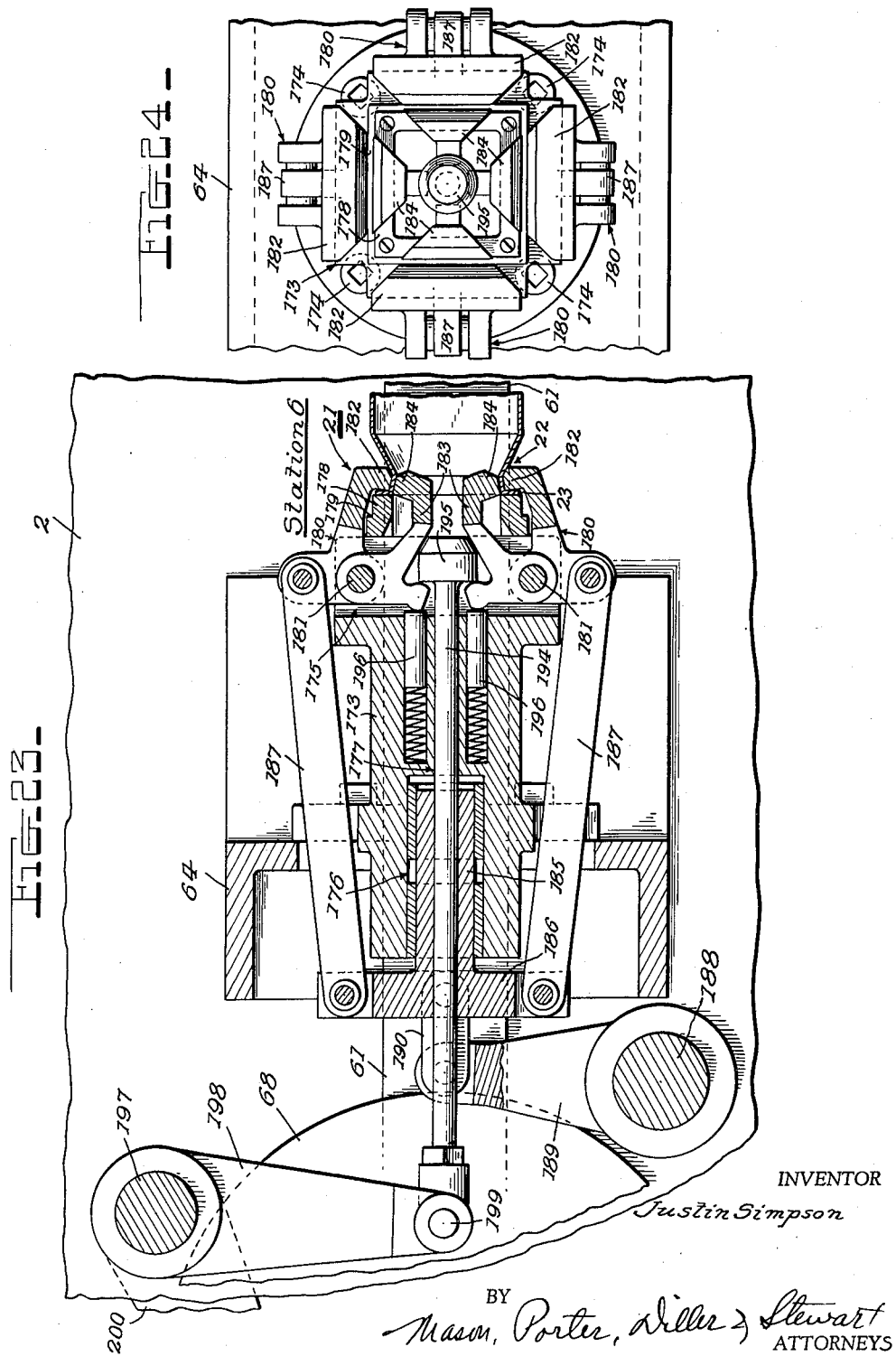

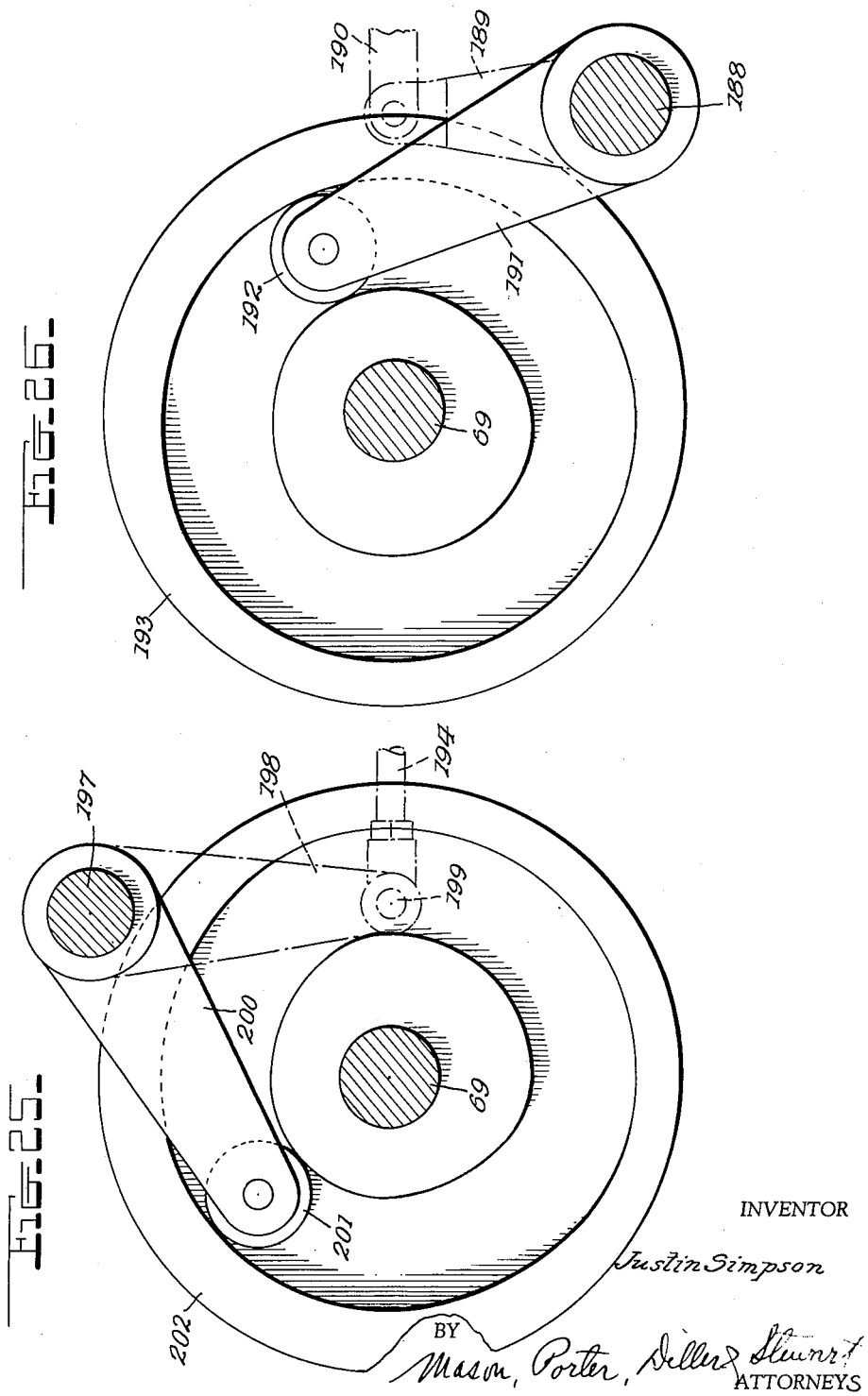

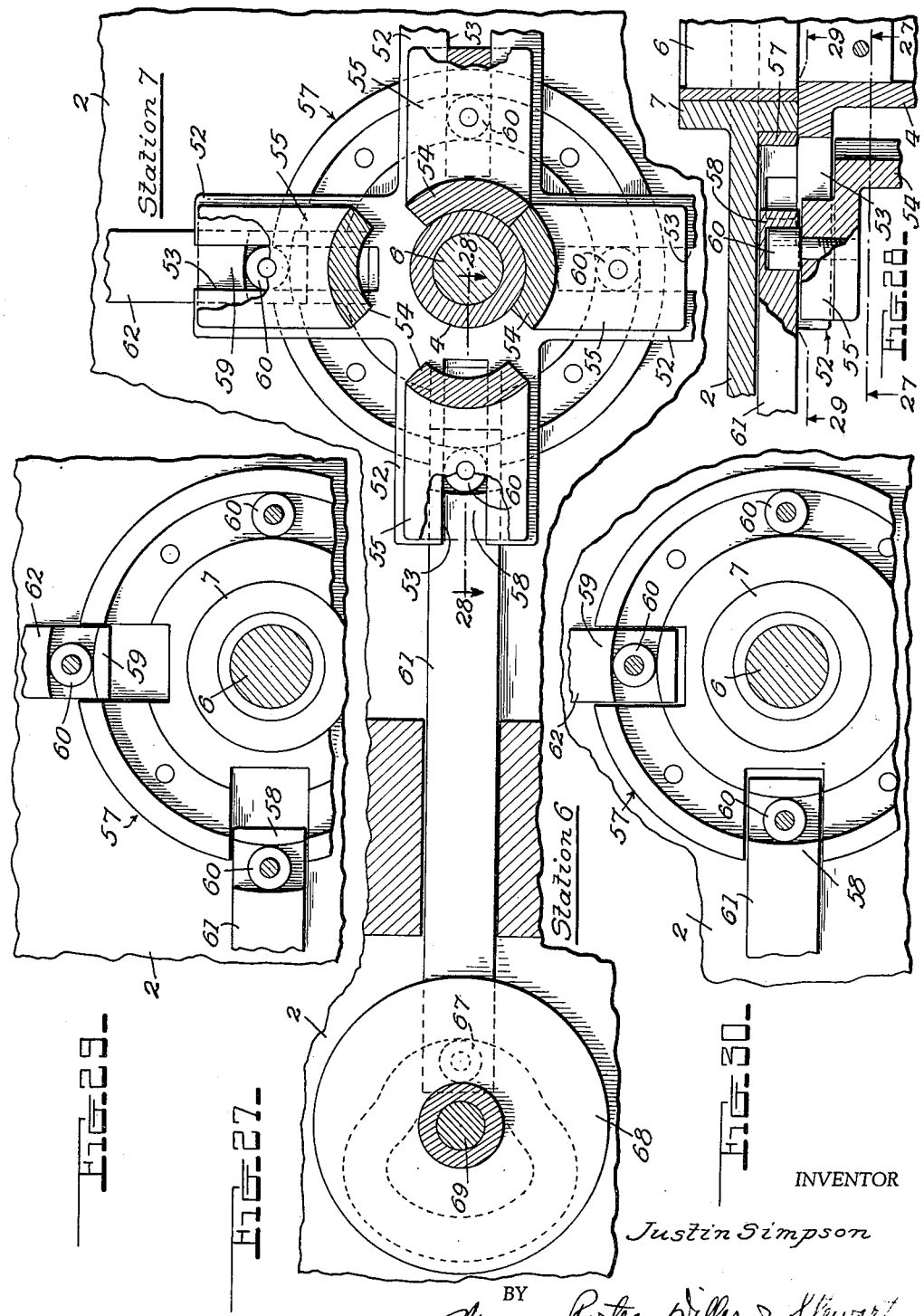

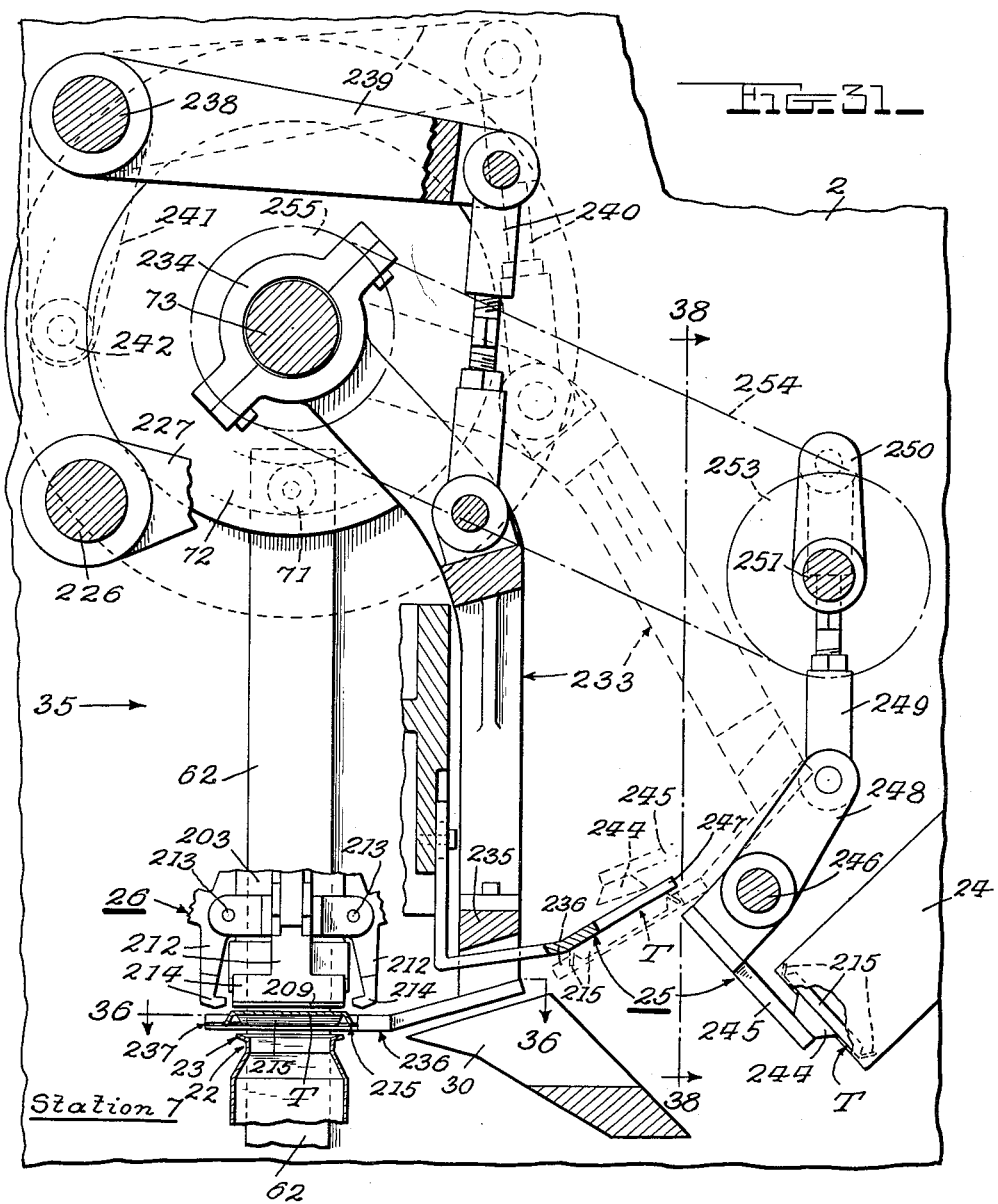

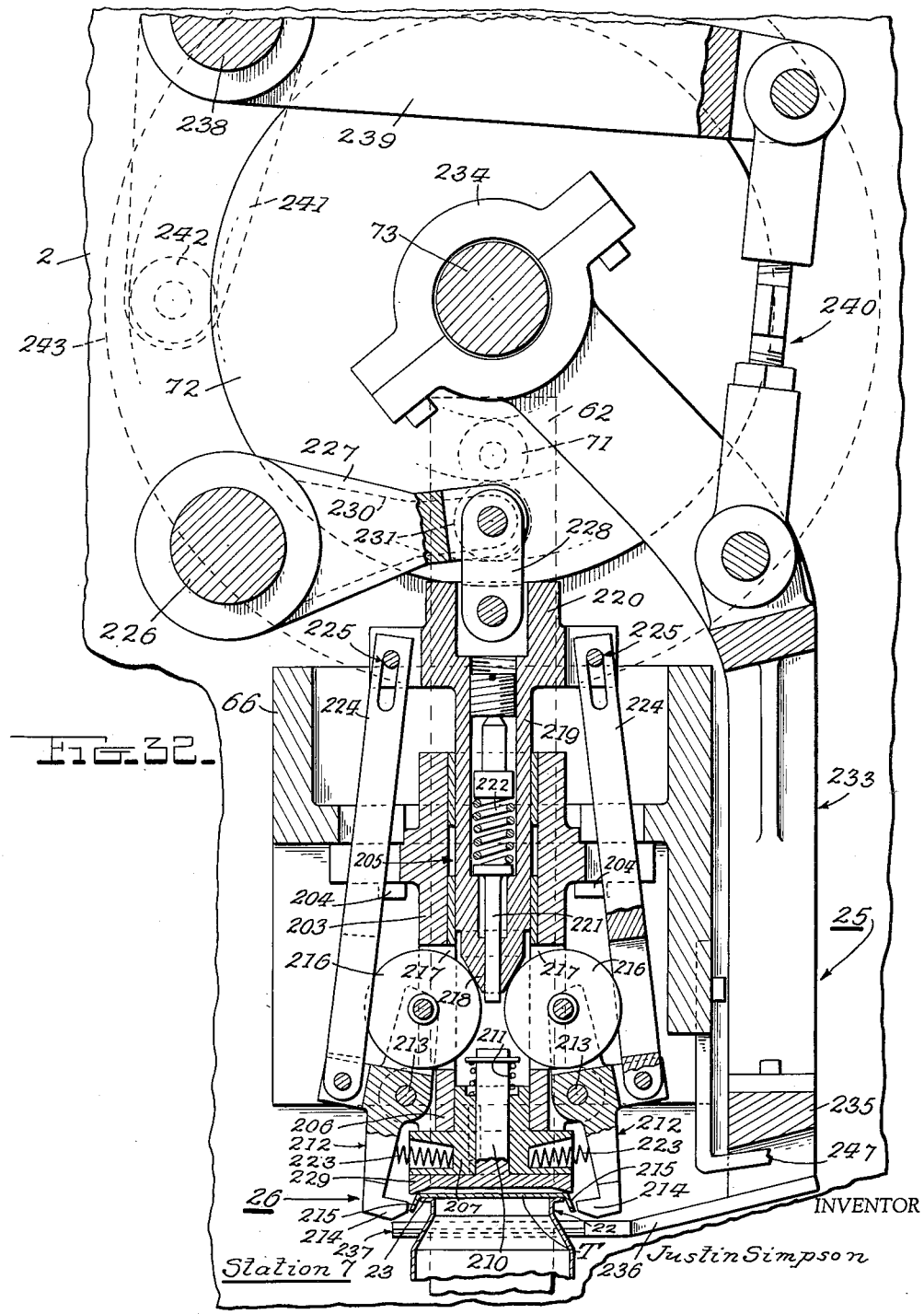

June 19, 1962 J. SIMPSON 3,039,368
MILK CARTON ASSEMBLING MACHINE
Filed Oct. 21, 1958 24 Sheets-Sheet 22
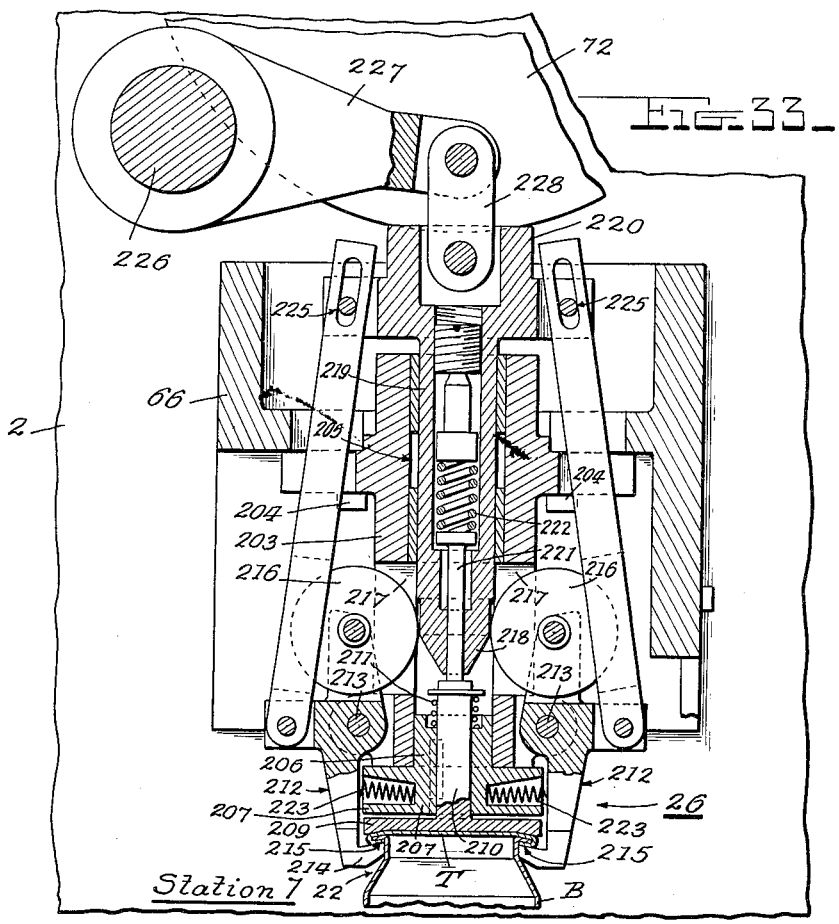
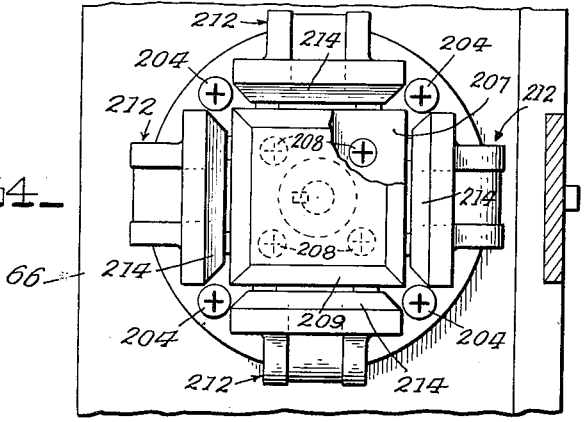
INVENTOR
Justin Simpson
BY
Mason, Porter,
ATTORNEYS

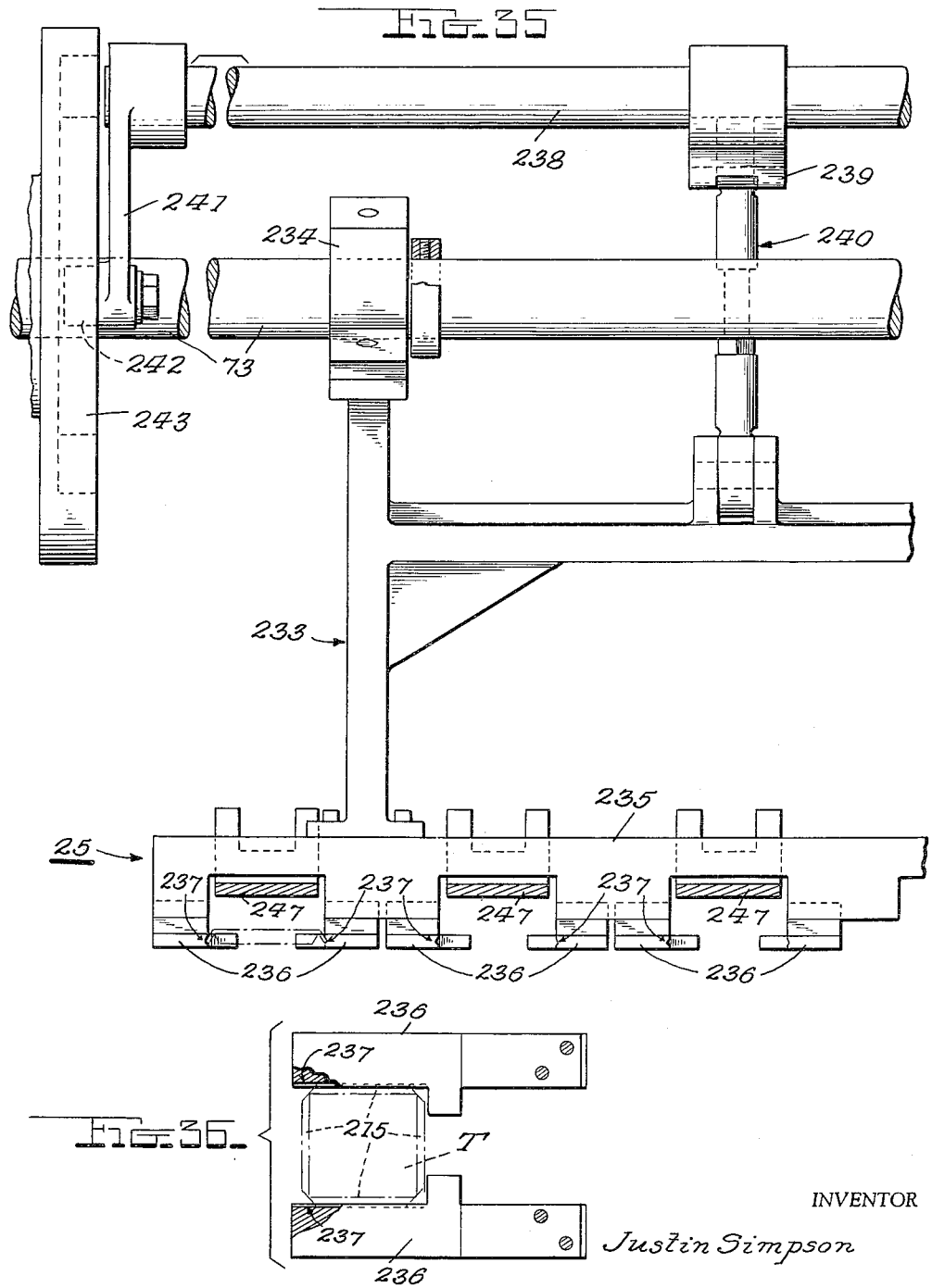

June 19, 1962   J. SIMPSON   3,039,368
MILK CARTON ASSEMBLING MACHINE
Filed Oct. 21, 1958   24 Sheets-Sheet 24
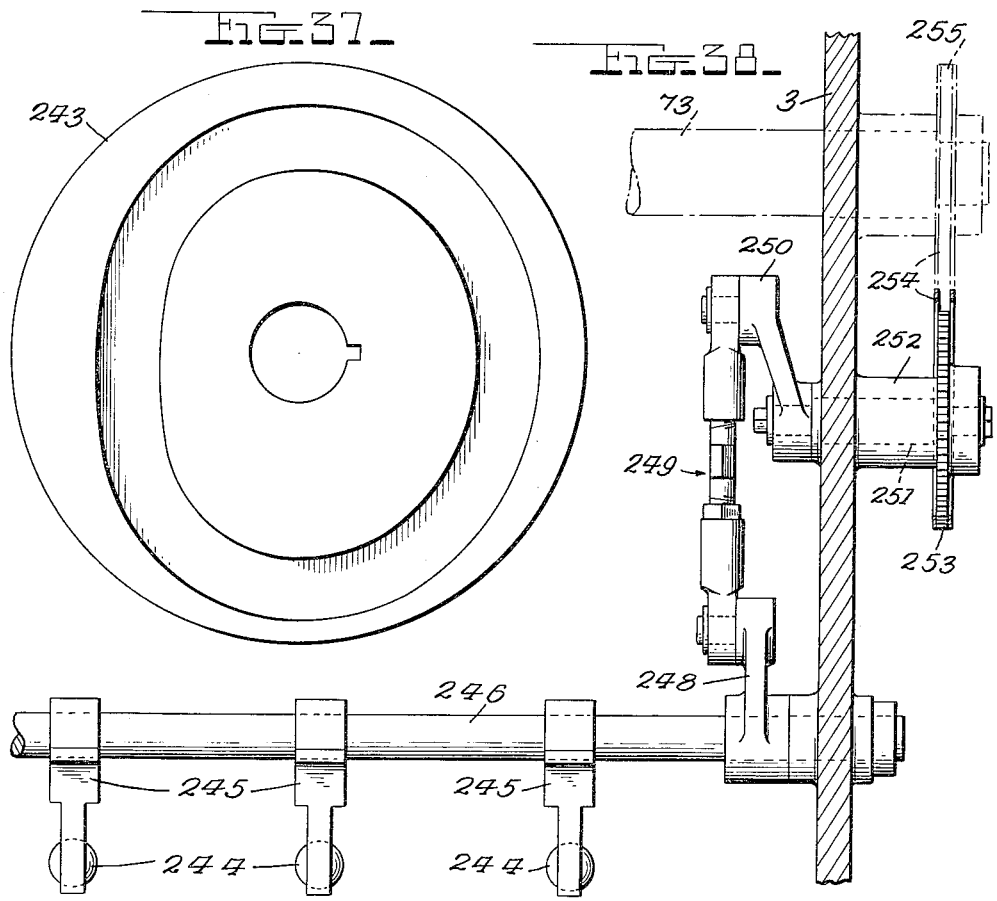
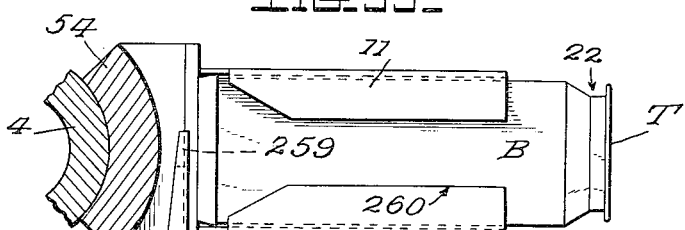
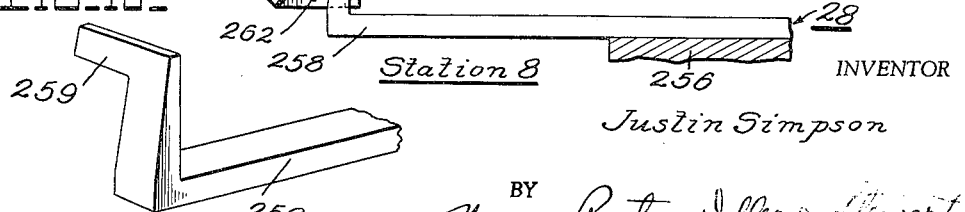
INVENTOR
Justin Simpson
BY Mason, Porter, Diller & Stewart
ATTORNEYS 3,039,368
MILK CARTON ASSEMBLING MACHINE
Justin Simpson, Elmhurst, Ill., assignor to Continental Can
 Company, Inc., New York, N.Y., a corporation of New
 York
Filed Oct. 21, 1958, Ser. No. 768,635
22 Claims. (Cl. 93—39.2)

This invention aims to provide a novel, rapid and reliable machine for use in the manufacture of cartons such as those commonly constructed from cardboard and employed primarily for retailing milk. However, as such cartons are also usable for fruit juices and other liquids, any use of "milk carton" herein appearing is to be considered as signifying carton type and not as limiting to field of use.

Specifically, the machine is intended for use in the manufacture of milk cartons having the general structure disclosed in U.S. patent application Serial No. 478,097, filed Dec. 28, 1954, now Patent No. 2,926,832, by Kaiji Negoro. The bodies of these cartons are necked-in and outwardly flanged at their upper ends and the carton tops have flanges which are clinched around the body flanges providing a strong union between the tops and the carton bodies and also providing for effectively gripping the upper ends of the cartons by hand.

One object of the invention is to provide novel turret means for successively presenting the carton bodies to different stations at which the carton bottoms are applied, the carton bodies are necked-in and flanged, and the flanged carton tops are clinched onto the necked-in and flanged body ends, respectively.

Another object is to provide a machine which will readily handle open-ended carton bodies which are normally in diagonally collapsed and therefore flat condition for stacking in hoppers, by providing for feeding the collapsed carton bodies from the stacks, opening said bodies into transversely square tubular form, and sliding each opened body onto a radial mandrel of a turret. This mandrel carries the opened body to a station at which the carton bottom is applied and also carries said body (and the attached bottom) to a transfer station at which it is slid into a radial pocket of another turret. This turret pocket carries the body and bottom to a necking-in and flanging station, then to a top-applying station and finally to a carton delivery station.

Still other objects are to provide rapid and reliable means for opening the diagonally collapsed carton bodies in readiness for sliding them onto the turret mandrels, and to provide novel means for holding each opened carton body in fully opened position while it is being slid onto its respective mandrel.

A still further object is to provide novel means for receiving flat bottom blanks from stacks, upwardly flanging these blanks and applying them to the carton bodies.

Another object is to provide novel transfer means for sliding each bottom-carrying carton body from its respective turret mandrel into the pocket of the other turret.

Yet another object is to provide for radially projecting the pocket to dispose the carton body in position to be acted upon by the necking-in and flanging means, and for thereafter engaging the carton with the flanged top and the means for clinching said top in place.

A still further object is to provide novel means for feeding the flanged carton tops from stacks and releasably holding them while the carton bodies are being moved against said tops to move them into position to be acted upon by the clinching means.

A further object is to provide novel ejecting means for removing the completed cartons from their carrying pockets.

Still further objects are to provide a novel jaw mechanism for necking-in and flanging the carton bodies and to provide a novel jaw mechanism for clinching the flanged carton tops onto the carton bodies.

With the above and other objects in view that will hereinafter appear, the nature of the invention will be more clearly understood by reference to the following detailed description, the appended claims and the several views illustrated in the accompanying drawings.

In the drawings:

FIGURES 1 and 1a jointly disclose a side elevation when the lines A—A and A¹—A¹ are matched.

FIGURES 2 and 2a jointly disclose a vertical transverse sectional view when the lines B and B¹ are matched. FIGURE 2 is cut substantially on line 2—2 of FIGURE 1, and FIGURE 2a on line 2a—2a of FIGURE 1a.

FIGURES 3 and 3a jointly disclose a vertical longitudinal sectional view when the lines C—C and C¹—C¹ are matched. FIGURE 3 is cut substantially on line 3—3 of FIGURE 2, and FIGURE 3a on line 3a—3a of FIGURE 2a.

FIGURE 4 is a horizontal sectional view substantially on line 4—4 of FIGURE 3 showing the construction of the upper turret and the means for radially projecting the turret pockets to engage the carton bodies with the necking-in and flanging means.

FIGURE 5 is a detail perspective showing one of the slidably mounted elements which are instrumental in effecting said radial projection of the upper turret pockets.

FIGURE 6 is a vertical longitudinal sectional view on line 6—6 of FIGURE 7, showing the means for feeding the diagonally collapsed carton bodies from a stack and opening them in readiness for sliding onto the mandrels of the lower turret.

FIGURE 7 is a top view substantially on line 7—7 of FIGURE 6.

FIGURE 8 is a vertical transverse sectional view on line 8—8 of FIGURE 6 illustrating primarily the operating means for the carton body opening means.

FIGURE 9 is a detail sectional view on line 9—9 of FIGURE 8.

FIGURE 10 is an enlarged fragmentary sectional view on line 10—10 of FIGURE 6 showing the carton blank opening means engaged with one of the collapsed carton bodies in readiness for opening the same.

FIGURE 11 is a similar view but showing the carton body almost completely opened.

FIGURES 12 and 12a jointly disclose, when the lines D and D¹ are matched, a vertical longitudinal sectional view showing the means for feeding the carton bottom blanks from a stack and applying them to the carton bodies carried by the mandrels of the lower turret, a blank being shown in readiness for application in FIGURE 12.

FIGURE 13 is a fragmentary view similar to the left hand portion of FIGURE 12 but showing the carton bottom applied to the carton body.

FIGURE 14 is a detail section on line 14—14 of FIGURE 12ª, showing the bottom blank guiding, hold down and feeding means.

FIGURE 15 is a detail view on line 15—15 of FIGURE 12.

FIGURE 16 is a detail sectional view through the outer end of one of the turret mandrels, on line 16—16 of FIGURE 12, illustrating pivoted filler blocks which normally occupy the positions shown, but are movable to the positions shown in FIGURE 21 by the transfer arms which slide the bottom-carrying carton body from its respective mandrel into one of the radial pockets of the upper turret.

FIGURE 17 is a fragmentary elevation of the operating means for the carton bottom applying means.

FIGURE 18 is a vertical sectional view showing the transfer arms and their operating means in readiness to slide a bottom-carrying carton body from a mandrel of the lower turret into a pocket of the upper turret.

FIGURE 19 is a fragmentary view similar to a portion of FIGURE 18 but showing the carton body during the act of transfer from mandrel to pocket.

FIGURE 20 is an enlarged fragmentary horizontal section on line 20—20 of FIGURE 18, more clearly showing the association of the transfer arms with the mandrel.

FIGURE 21 is an enlarged detail section on the plane of line 21—21 of FIGURE 19 but showing the transfer arms further raised without interference from the pivoted filler blocks.

FIGURE 22 is an enlarged vertical longitudinal section on line 22—22 of FIGURE 4, showing the jaw mechanism for necking-in and flanging the carton bodies and illustrating one of the carton bodies in readiness to be acted upon by said jaw mechanism.

FIGURE 23 is a similar view but showing the positions of parts at the completion of the necking-in and flanging operations.

FIGURE 24 is an end view of the jaw mechanism shown in FIGURES 22 and 23.

FIGURE 25 is a view illustrating the cam means for actuating the inner jaws of FIGURES 22 to 24.

FIGURE 26 is a similar view illustrating the cam means for actuating the outer jaws of FIGURES 22 to 24.

FIGURE 27 is an enlarged vertical longitudinal sectional view substantially on line 27—27 of FIGURES 4 and 28, showing the upper turret construction and the means for radially projecting the pocket-carrying members thereof to position each carton body as in FIGURE 22, in readiness for necking-in and flanging. This view also shows part of the means for radially projecting the pockets to insert the cartons into the jaw mechanisms which clinch on the carton tops.

FIGURE 28 is a detail horizontal section on line 28—28 of FIGURE 27.

FIGURE 29 is a detail vertical section on line 29—29 of FIGURE 28 showing the means for shifting the pocket-carrying members of the turret to radially project and retract the pockets and the pocket-carried carton bodies, the parts being shown in pocket projecting position.

FIGURE 30 is a view similar to FIGURE 29 but showing the parts in normal pocket-retracted position.

FIGURE 31 is a vertical longitudinal sectional view showing the means for feeding the flanged carton tops into position for engagement with the carton bodies. One of the tops is shown in readiness for upward movement into the carton top clinching-on jaw mechanism upon upward shifting of the subjacent carton body. The view also shows parts of the means for so shifting the carton body.

FIGURE 32 is an enlarged vertical sectional view illustrating primarily the top clinching-on jaw mechanism and showing the carton body and top lifted into position to be acted upon by said jaw mechanism.

FIGURE 33 is a view similar to a portion of FIGURE 32 but showing the relation of elements at the end of the top clinching-on operation.

FIGURE 34 is a lower end view of the jaw mechanism shown in FIGURES 32 and 33.

FIGURE 35 is a fragmentary elevation looking in the direction of arrow 35 of FIGURE 31, showing the swingable feed frame for the carton tops.

FIGURE 36 is a view on line 36—36 of FIGURE 31, showing the tines of the feed frame which carry the carton tops to required position in readiness for application.

FIGURE 37 is an elevation of the cam for operating the swingable feed frame.

FIGURE 38 is a view on line 38—38 of FIGURE 31, showing the means for moving the carton tops from a stack and engaging them with the aforesaid tines of the swingable feed frame.

FIGURE 39 is a fragmentary view showing a completed carton in readiness for ejection from its respective turret pocket and illustrating the ejecting member in readiness to act.

FIGURE 40 is a perspective view showing part of the ejecting member of FIGURE 39.

The machine is shown as constructed to (1) feed five diagonally collapsed open-ended carton bodies at a time from stacks; (2) simultaneously open the five collapsed carton bodies; (3) simultaneously apply bottoms to the five opened carton bodies; (4) neck-in and flange the five opened carton bodies simultaneously in readiness for carton top application; (5) clinch flanged carton tops simultaneously to the five necked-in and flanged carton bodies; and (6) simulaneously discharge the five completed cartons. However, it is to be understood that the machine could well be constructed to perform corresponding operations in connection with other numbers of carton bodies.

*General Explanation*

Referring first to FIGURES 1 and 1ª, FIGURES 2 and 2ª, and FIGURES 3 and 3ª, it will be seen that a base 1 is provided to which the lower ends of two laterally spaced side plates 2 and 3 are secured. Between the side plates 2 and 3, an upper turret U and a lower turret L are mounted on parallel vertically spaced shafts. The upper turret shaft 4 is rotatably mounted at one end in a bearing 5 (FIGURE 2) carried by the side plate 2. The other end of the shaft 4 is provided with a stub 6 (FIGURE 2) which is rotatably mounted in a bearing 7 carried by the side plate 3. The lower turret shaft 8 is rotatably mounted in bearings 9 (FIGURE 2ª) carried by the side plates 2 and 3.

The lower turret L has five groups of radial mandrels 10; the mandrels of each group are spaced apart 90°; and provision is made for intermittently driving or indexing said lower turret in steps of 90° length. At the end of each step, two of the mandrels 10 of each group are horizontally aligned and the other two of said mandrels are vertically aligned. Thus, each mandrel of each group is successively presented at four stations during each revolution of the turret L. These stations are identified in FIGURE 3ª as "Station 1," "Station 2," "Station 3" and "Station 4." These same identifications are employed also in other views showing the work performing mechanisms located at the stations. At "Station 1" the mandrel 10 is in one horizontal position; at "Station 2" it is in a downwardly projecting position; at "Station 3" it is in a second horizontal position; and at "Station 4" it is in an upwardly projecting position.

The upper turret U has five groups of radial pockets 11: the pockets of each group are spaced apart 90°; and provision is made for intermittently driving or indexing said upper turret in steps of 90° length. At the end of each step, two of the pockets 11 of each group are horizontally aligned and the other two pockets are vertically aligned. Thus, each pocket of each group is successively presented at four stations during each revolution of the turret U. These stations are identified in FIGURE 3 as "Station 5," "Station 6," "Station 7" and "Station 8." These same identifications are employed also in other views showing the work performing mechanisms located at the stations. At "Station 5," the pocket is in a downwardly projecting position in vertical alignment with the mandrel 10 at "Station 4"; at "Station 6" the pocket is in one horizontal position; at "Station 7" it is in an upwardly projecting position; and at "Station 8" i tis in a second horizontal position.

At "Station 1," reciprocatory feed means 12 feeds five diagonally collapsed open-ended carton bodies B from a transverse row of five hoppers 13 along a feed table 14; the five collapsed carton bodies are opened by body opening means 15; and the opened carton bodies are slid frictionally onto the mandrels 10 at said "Station 1,'" as seen in FIGURE 3ᵃ. Upon the next indexing step of the lower turret L, therefore, the mandrel-carried carton bodies B are moved to "Station 2."

At "Station 2," reciprocatory feed means 16 feeds five carton bottom blanks B¹ from a transverse row of five hoppers 17 along guide tracks 18 and said blanks are upwardly flanged and applied to the carton bodies B by means 19 as seen in FIGURE 3ᵃ. Upon the next indexing step of the turret L, the bottom-carrying carton bodies B are moved to "Station 3" at which no work is performed.

Upon the next indexing step of the turret L, the bottom-carrying carton bodies B are moved to "Station 4." At this station, these bodies are slid from the mandrels 10 into the pockets 11 of the upper turret U and thus transferred to "Station 5" as seen in FIGURE 3. Reciprocatory transfer mechanisms 20 effect this transfer.

Upon the next indexing step of the turret U, the bottom-carrying carton bodies B are moved to "Station 6." At this station jaw mechanisms 21 neck-in the outer ends of the carton bodies at 22 and outwardly flange them at 23 as seen in FIGURE 3.

Upon the next indexing step of the turret U, the necked-in and flanged carton bodies B and their attached bottoms B¹ are moved to "Station 7." At this station, flanged carton tops T are fed from hoppers 24 by feed means 25 and are clinched onto the flanged ends of said carton bodies, by means of jaw mechanisms 26.

Upon the next indexing step of the turret U, the completed cartons are moved to "Station 8." At this station, the cartons are slid from the pockets 11 onto a conveyor 27, by means of a reciprocatory ejecting means 28.

The bottom blanks B¹ are coated with thermoplastic adhesive for securing them to the carton bodies: and heating means 29 (FIGURE 3ᵃ) is provided to impart a tacky state to the adhesive during the step-by-step movement of the blanks to the bottom applying means 19.

Similarly, the flanges of the carton tops T are coated with thermoplastic adhesive for securing them to the carton body flanges: and heating means 30 (FIGURE 3) is provided to impart a tacky state to said adhesive during feeding of the tops into position for application.

*Turret Driving Means (See FIGURES 1, 1ᵃ, 2 and 2ᵃ)*

Geneva gearing is provided for intermittently driving or indexing the upper and lower turrets U and L. The driven members 31 and 32 of the gearing are secured to the upper and lower turret shafts 4 and 8, respectively. The driving members 33 and 34 are secured respectively to an upper spur gear 35 and a lower spur gear 36 which mesh with each other. A driving pinion 37 on the shaft of an electric motor M meshes with the gear 36. The two gears 35 and 36 are thus continuously driven in opposite directions and the Geneva gearing intermittently drives or indexes the turrets U and L in opposite directions. The gears 35 and 36 are located between the side plate 2 and a fixed vertical plate 2ᵃ which is spaced outwardly from said side plate 2. The plate 2ᵃ is provided with an upper bearing 38 (FIGURE 2) in which the shaft 39 of the upper gear 35 is rotatably mounted. Plate 2ᵃ is also provided with a lower bearing 40 (FIGURE 2ᵃ) in which the shaft 41 of the lower gear 36 is rotatably mounted. A sprocket 42 (FIGURE 1) is secured to the upper shaft 39: and a sprocket 43 (FIGURE 1ᵃ) is secured to the lower shaft 41. The upper sprocket 42 continuously drives an upper chain 44: and the lower sprocket 43 continuously drives a lower chain 45. These chains drive various mechanisms as hereinafter explained.

*Lower Turret L (See FIGURE 16 and FIGURES 18 to 21)*

Each lower turret L has individual hubs 46 secured on the shaft 8 with each hub carrying one group of the mandrels 10. Each of these mandrels 10 has stop shoulders 47 near its inner end to abut the inner end of the carton body B when this body is slid onto the mandrel: and said stop shoulders 47 assure that the outer end of the carton body shall be flush with the outer end surface 48 of the mandrel. The sides of the mandrel which face toward the ends of the shaft 8 have longitudinal grooves 49 in which parts of the transfer means 20 are movable when transferring the carton body from "Station 4" to "Station 5." Filler blocks 50 are pivotally mounted in the outer end of each mandrel 10 at the outer ends of the grooves 49: and said filler blocks 50 are normally held in the position shown in FIGURE 16, by means of a spring 51. The filler blocks 50 are then flush with the outer ends of the grooved mandrel sides and flush with the end surface 48 of the mandrel to allow the latter to solidly back-up the carton body walls while the carton bottom B¹ is being secured in place at "Station 2." However, the filler blocks 50 are moved to the position of FIGURE 21 by the above mentioned portions of the transfer means 20 as said portions complete transfer of the carton body from "Station 4" to "Station 5." The portions of the transfer means which travel in the grooves 49 and move the filler blocks will be described when later describing the transfer means 20.

*Upper Turret U (See FIGURES 2, 3, 4 and 27 to 30)*

The shaft 4 of the upper turret U is shown as tubular but this is not essential. Each end portion of this shaft is provided with four radial arms 52 spaced inwardly from the side plates 2 and 3, said arms having four radial slots 53, respectively, the slots at each end of the shaft being spaced 90° apart. Four transversely segmental bars 54 jointly surround and extend longitudinally of the shaft 4 and the ends of said bars have radial projections 55 slidable in the slots 53 to guide each bar 54 as it is moved away from the shaft 4 and back toward said shaft. Additional guide means for the bars 54 are provided in the form of bar-carried pins 56 slidable in openings in the shaft 4. Each one of the bars 54 carries five of the pockets 11 and therefore mounts said pockets for radial projection. Such projection is necessary at "Station 6" to position the carton bodies for necking-in and flanging and at "Station 7" for application of the carton tops T as will later become more apparent. For outwardly shifting the bars 54 to radially project the pockets 11 and for returning said bars to retract said pockets, the construction now to be described is provided.

Two circular tracks 57 are provided, one at each end of the turret U and concentric therewith, said tracks being disposed between the slotted arms 52 of the bars 54 and the side plates 2 and 3. Each track 57 has a horizontally shiftable section 58 (FIGURES 4 and 5, and FIGURES 27 to 30) and an upwardly shiftable section 59 (FIGURE 2 and FIGURES 27 to 30). The sections 58 are at "Station 6" and the sections 59 are at "Station 7." The arms 52 of the bars 54 have rollers 60, respectively, and these rollers engage the tracks 57. During each indexing movement of the turret U all of the shiftable track sections 58 and 59 occupy their innermost positions toward the turret axis, as seen in FIGURE 30. Therefore, the rollers 60 hold the pocket carrying bars 54 against the turret shaft 4. However, when indexing is complete, the track sections 58 are shifted horizontally away from the turret axis and the track sections 59 are shifted upwardly away from said axis, as seen in FIGURES 27, 28 and 29. These movements pull the bar 54 and pockets 11 at "Station 6" toward the necking-in and flanging mechanisms 21 to project the carton bodies B into position to be acted upon by said mechanisms 21, and lift the bar 54 and pockets 11 at "Station 7," to engage the carton bodies B with the carton tops T and position the cartons and tops in readiness for operation of the top-clinching-on mechanisms 26. After the mechanisms 21 and 26 have acted, the track sections 58 and 59 and pockets 11 are turned to their normal position and the next indexing step occurs.

In the present disclosure, the track sections 58 are integral with horizontally slidable bars 61 (FIGURES 4 and 5, and FIGURES 27 to 30) and the track sections 59 are integral with vertically slidable bars 62 (FIGURE 4 and FIGURES 27 to 30). The horizontal bars 61 lie against the inner sides of the side plates 2 and 3 and are slidably mounted in grooves 63 in the ends of a fixed transverse beam 64 upon which the necking-in and flanging mechanisms 21 are mounted. The vertical bars 62 also lie against the inner sides of the side plates 2 and 3 and these bars are slidably mounted in grooves 65 in the ends of a fixed transverse beam 66 on which the top applying mechanisms 26 are mounted.

The ends of the horizontal bars 61, remote from the turret axis, have cam followers 67 (FIGURES 4 and 27) which engage cams 68 on a transverse shaft 69 (FIGURES 1, 3 and 4). This shaft 69 has a sprocket 70 continuously driven by the chain 44 (FIGURE 1). The cams 68 slide the bars 61 to horizontally project and retract the pockets 11 at "Station 6" as required.

The upper ends of the vertical bars 62 have cam followers 71 (FIGURES 2, 31 and 32) which engage cams 72 on a transverse shaft 73 and this shaft has a sprocket 74 (FIGURES 1 and 2) which is continuously driven by the chain 44. The cams 72 slide the bars 62 to vertically project and retract the pockets 11 as required.

Bearings for the shaft 69 are shown at 75 on the side plates 2 and 3: and bearings 76 for the shaft 73 are shown in FIGURE 2, these bearings being also on the side plates 2 and 3.

*Station 1 (FIGURES 3ª and 6 to 11*

The feed table 14 is shown as extending from the side plate 2 to the side plate 3 and mounted at 77 (FIGURE 8) on said plates. Parallel rails 78 divide the table top into separate feedways 79 for the diagonally collapsed carton bodies B. As five carton bodies are to be fed at a time from the hoppers 13, there are five of the feedways 79. One of the collapsed bodies is shown in FIGURE 10 without regard to any longitudinal seam which it may have. Hold-down bars 80, suitably connected with fixed transverse bars 81, are associated with the feedways 79 to prevent the collapsed carton bodies from upwardly disengaging from the feed dogs 82 of the feed means 12 and to hold said bodies in each position to which they are advanced.

The feed means 12 includes a carriage 83 reciprocably mounted at 84 on a transverse beam 85 which is secured at its ends to the side plates 2 and 3. The carriage 83 is provided with fingers 86 carrying some of the feed dogs 82, and with a plate 87 carrying the rest of said dogs 82. The plate 87 also carries feed fingers 88 to feed the collapsed carton bodies from the bottoms of stacks in the hoppers 13.

At the end of each feedway 79 toward the turret L, there is a fixed longitudinally extending plate 89 which is disposed in a vertical plane at one longitudinal edge of said feedway. Secured to the upper edge of this vertical plate 89 is a horizontal plate 90 which projects laterally from said vertical plate and overhangs the feedway. The free longitudinal edge portion of each plate 90 has latches 91 to hold the carton bodies against re-collapse after they have been opened, as will be clear from FIGURE 11. When the collapsed carton bodies B arrive in positions abreast of the vertical plates 89, the means 15 opens said bodies (see FIGURE 11), the latches 91 hold them in open position and the opened bodies are then fed onto the turret mandrels 10.

The carton body opening means 15 includes an upper series of suction cups 92 operable through notches 93 in the horizontal plates 90, and a lower series of suction cups 94 operable in notches 95 in the feed table 14. There are one upper cup 92 and one lower cup 94 allotted to each of the feedways 79. The lower cup 94 engages and holds down one lower wall *a* of the collapsed carton body while the upper suction cup 92 engages another wall *b* and operates to lift this wall to open the carton as will be seen by comparing FIGURES 10 and 11. The opened carton body is then held against re-collapse by the latches 91 as it is pushed onto the mandrel 10. To aid in such holding of the carton bodies, vertical bevelled guide bars 96 preferably extend from the horizontal plates 90 to the feed table 14.

An upper suction manifold 97 carries the upper suction cups 92 and a lower suction manifold 98 carries the lower suction cups 94. The ends of the upper manifold 97 are pivoted at 99 to arms 100 secured respectively to two short rock shafts 101 which are mounted in bearings 102 secured to the side plates 2 and 3. One of these rock shafts 101 has an operating arm 103 to which one end of a link 104 is pivoted. This link extends through an opening 105 in plate 2 and is pivoted to an arm 106 which projects downwardly from one end of a rock shaft 107. This shaft is mounted in a bearing 108 carried by the side plate 2. The other end of the rock shaft 107 has an arm 109 which is provided with a cam follower 110. This follower engages a barrel cam 111 which is rotatably mounted on a stub shaft 112 secured to the side plate 2. A sprocket 113 is secured to the outer end of the cam 111 and is continuously driven by the chain 45 (see FIGURES 1ª and 2ª). The barrel cam 111 has a peripheral cam 114 (FIGURES 8 and 9) which operates a valve 115 to start and stop vacuum in the manifolds 97 and 98.

The lower manifold 98 is secured to the lower ends of the two vertical rods 116 which are slidably mounted in guides 117 secured to the side plates 2 and 3. The upper ends of the rods 116 are equipped with cam followers 118 which rest on cams 119 secured on the rock shafts 101.

Operation of the barrel cam 111 causes movement of the rock shafts 101 to cause the arms 100 to raise and lower the upper manifold 97 and its suction cups 92 as required. The cams 119 cause raising and lowering of the lower manifold 98 and its suction cups 94 as required. When any suction cup 92 is fully raised it is in somewhat stretched condition. Therefore, when vacuum is stopped, the cup will spring upwardly and free the carton body wall *b*. Similarly, when any suction cup 94 is fully lowered, it is in a somewhat stretched condition. Therefore, when vacuum is stopped, it will spring downwardly and free the carton body wall *a*.

*Station 2 (See Figures 2ª, 3ª and 12 to 17)*

The bottom applying means 19 includes a transverse row of five upwardly cupped dies 120, said dies being mounted in positions to respectively underlie the mandrels 10 at "Station 2" after indexing of the lower turret L. Each die 120 has a downwardly projecting shank 121 and all of these shanks are slidable in a bracket 122 secured to the base 1. The shanks 121 are linked at 123 to arms 124 on a transverse rock shaft 125. One end of this rock shaft 125 is mounted in a bearing 126 on the base 1 and the other end of said shaft is mounted in a bearing 127 on an outwardly offset portion 128 of the side plate 2. The shaft 125 has an actuating arm 129 provided with a cam follower 130 which is engaged by a cam 131 within the offset plate portion 128. The cam 131 is secured to a short shaft 132 rotatably mounted in a bearing carried by the offset plate portion 128: and the outer end of this shaft 132 is provided with a sprocket 133 continuously driven by the chain 45 as best seen in FIGURES 1a and 2a. The cam 131 causes movements of the rock shaft 125 to effect raising and lowering of the dies 120.

Each die 120 contains a plate 134 carried by the upper end of a stem 135 which is slidable in the shank 121. The stem 135 and plate 134 are upwardly biased to the position shown in FIGURE 12 by means of a spring 136, as long as the die 120 remains in its lowered position. With the die in this lowered position, a bottom blank B¹ is positioned between it and the aligned mandrel 10 as seen in FIGURE 12. Then, the die rises, flanges the blank B¹ and applies it to the carton body on said mandrel 10, as shown in FIGURE 13. During this shaping and application of the bottom blank B¹, the spring 136 becomes compressed and exerts an upward force on the plate 134 to press the blank solidly against the lower end of the mandrel 10. After bottom application, the die 120 again lowers and indexing occurs to move the bottom-carrying carton body to "Station 3."

Two of the blank guiding tracks 18 are allotted to each die 120 and hopper 17. The inner ends of these tracks are secured upon a fixed transverse bar 137 and the outer ends of said tracks are secured upon another fixed transverse bar 138. Throughout their lengths, the tracks 18 have receiving grooves 139 for opposite edges of the bottom blanks B¹. The tracks 18 also have supporting flanges 140 for the blanks B¹ but these flanges terminate short of the dies 120. Hold-down shoes 141 are suitably mounted over the flanges 140 to frictionally hold the bottom blanks B¹ in the positions to which they are successively advanced by the feed means 16. This means includes a feed plate 142 secured upon a horizontally reciprocable carriage 143 and located under the tracks 18. The outer end portion of the feed plate 142 is divided into fingers 144 operable in notches 145 in the outer track mounting bar 138. The fingers 144 carry feed members 146 for feeding the bottom blanks B¹ from stacks in the hoppers 17 and advancing the blanks to the position shown in FIGURE 12a. Feed dogs 147 on the feed plate 142 further advance the blanks to finally locate them between the dies 120 and the mandrels 10 at "Station 2." Then, the dies 120 operate to force the blanks from the track grooves 139, shape the blanks into flanged form and apply them to the carton bodies B. It will be recalled that the blanks B¹ have thermo-plastic coatings where necessary and that these coatings are heated to tacky condition by the heater 29, as the blanks are fed.

*Carriage Operating Means (See Figures 1a, 2a and 3a)*

The carriage 143 is slidably mounted at 148 upon a support 149 secured to the base 1: and said carriage is connected by a link 150 (FIGURE 3a) to an arm 151 on a transverse rock shaft 152. The inner end of this rock shaft 152 is mounted in a bearing 153 formed on a bracket 154 which is secured upon the base 1, as seen in FIGURES 2a and 3a. The outer end of the rock shaft 152 is mounted in a bearing 155 (FIGURES 1a and 2a) on the base 1. This outer end of shaft 152 has an arm 156 (FIGURE 1a) which is connected by a pitman 157 with a wrist pin 158 carried by a disk 159 secured to the continuously driven sprocket 133. The rock shaft 152 is thus oscillated to cause its arm 151 and the link 150 to reciprocate the carriage 143 to feed the bottom blanks B¹ to the dies 120. By similar elements 150a, 151a 152a, 156a, 157a and 158a, the continuous rotation of the sprocket 113 is utilized to reciprocate the carriages 83 at "Station 1."

*Stations 3, 4 and 5 (See Figures 3a and Figures 18 to 21)*

"Station 3" is an idle station at which no work is employed but the transfer means 20 for transferring the carton bodies B and their attached bottoms B¹ from the mandrel 10 at "Station 4" to the pockets 11 at "Station 5" is mounted near said "Station 3." This transfer means includes a vertically reciprocable carriage 160 mounted at 161 upon a vertical transverse plate 162 which extends between and is secured to the side plates 2 and 3. To the carriage 160, a transverse bar 163 is secured and to this bar five pairs of transfer arms 164 are secured. There is one pair of these transfer arms 164 allotted to each group of the mandrels 10 and they are laterally spaced to straddle these mandrels. The free ends of the arms 164 have transfer fingers 165 movable into and along the mandrel grooves 49 as said arms 164 are raised from the position of FIGURE 18 to transfer the carton bodies from the mandrels at "Station 4" into the pockets 11 at "Station 5." In FIGURE 19, this transfer has almost been completed. As it is completed, the fingers 165 strike the filler blocks 50 of the mandrels and move said blocks out of the way, as seen in FIGURE 21. The transfer arms 164 are then returned to lowered positions by the carriage 162.

The carriage 160 is linked at 166 to a bell crank 167 on a transverse rock shaft 168 which is mounted in bearings carried by the side plate 2 and 3. One end of this rock shaft 168 has an arm 169 (FIGURES 1a and 18) which is connected by a pitman 170 to a wrist pin 171 carried by a disk 172 which is secured to the sprocket 43. Thus, the continuous rotation of this sprocket 43 is utilized to cause vertical reciprocation of the carriage 160 which carries the transfer arms 164.

*Station 6 (See FIGURE 4 and FIGURES 22 to 26)*

There is a transverse row of five of the mechanisms 21 for necking-in and flanging the bottom-carrying carton bodies B presented to "Station 6." These mechanisms are mounted on the transverse beam 64 previously described. All of these mechanisms are identical and one has been shown in detail in FIGURES 22, 23 and 24.

A body 173 is secured at 174 to the beam 64 and projects toward the upper turret U. The front end of this body 173, toward the turret U, is recessed at 175, the other or rear end of said body has an axial bore 176, and a smaller axial bore 177 extends from said bore 176 to the recess 175. A square die 178 is secured to the front end of the body 173 and is sized and shaped for snug reception in the open end of the carton body when this body is projected to the position of FIGURE 22. It will be recalled that this projection is effected by outward shifting of the body carrying pocket 11 by the means shown primarily in FIGURES 27 to 30. The die 178 is shouldered at 179 to abut the carton body end.

Four outer longitudinal arms 180 are pivotally mounted at 181 in the recess 175 and these arms project forwardly in outwardly spaced relation with the outer edges of the die 178. The front ends of the arms 180 have transverse jaw portions 182 which, when the arms 180 are moved inwardly, neck in the carton body at 22 and flange it at 23 against the flat front face of the die 178.

Four inner longitudinal arms 183 are mounted on the same pivots 181 as the outer arms 180. The inner arms 183 project forwardly through the die 178 and have transverse jaw portions 184 opposed to the outer jaw portions 182 and positioned to abut the inner side of the carton body. As the outer jaw portions 182 are moved inwardly, the inner jaw portions 184 move correspondingly. Compare FIGURES 22 and 23.

A plunger 185 is mounted in the bore 176 and has a head 186 at the rear end of the body 173. This head is connected with the outer arms 180 by links 187.

Therefore, when the plunger 185 is moved forwardly from the position of FIGURE 22 to that of FIGURE 23, the arms 180 are swung inwardly, and when said plunger is again moved rearwardly, said arms 180 are returned to the position of FIGURE 22. For so moving the plunger 185, the means now to be described is employed.

A transverse rock shaft 188 is mounted in bearings carried by the side plates 2 and 3. This rock shaft has an upstanding arm 189 for each of the plungers 185 and each arm is linked at 190 to its respective plunger. One end of the shaft 188 has an arm 191 (FIGURES 4, 22 and 26) which is provided with a cam follower 192. This follower engages a cam 193 on the continuously driven shaft 69 above described. Oscillation of the rock shaft 188 is thus effected to produce the required movements of the plungers 185.

A rod 194 extends slidably through the plunger 185 and the bore 177 and has a head 195 on its front end. This headed rod is operable when moved rearwardly, to inwardly swing the inner arms 183 from the position of FIGURE 22 to that of FIGURE 23: and said headed rod, when moved again forwardly, allows return of said arms 183 to said position of FIGURE 22. This return of the arms 183 is effected by spring-pressed pins 196 mounted in the front end of the body 173. For imparting the required movements to the rod 194, the means now to be described is employed.

A transverse rock shaft 197 is mounted in bearings carried by the side plates 2 and 3: and said shaft has downwardly projecting arms 198 allotted one to each rod 194. The arms 198 is pivoted at 199 to the rear end of the rod 194. The rock shaft 197 is provided also with an actuating arm 200 having a cam follower 201 which engages a cam 202 on the aforesaid continuously driven shaft 69. Thus, the rotation of this shaft 69 is utilized to cause the required movements of the rods 194. It will be recalled that this same shaft 69 and its cams 68, serve to cause projection of the carton body B into position to be acted upon by the jaw mechanism 21, and to cause retraction of said carton body after operation of said jaw mechanism.

*Station 7 (See FIGURES 1, 2 and 3 and FIGURES 31 to 38)*

There is a transverse row of five of the carton top applying mechanisms 26 mounted on the transverse beam 66. These mechanisms are identical and one has been shown in detail in FIGURES 32, 33 and 34.

A vertically elongated body 203 is secured at 204 to the beam 66 and projects downwardly therefrom. The body 203 has a longitudinal bore 205 in the lower end of which an upstanding stud 206 on a lower end block 207 is received. The block 207 is secured to the body 203 by screws 208 shown in FIGURE 34. A square pressure plate 209 underlies the end block 207 and has an upstanding shank 210 which extends slidably through the stud 206: and a spring 211 biases said shank 210 upwardly to normally hold the pressure plate 209 against the end block 207, as seen in FIGURE 32.

Four vertical levers 212 are fulcrumed at 213 to the lower end of the body 203. The lower ends of these levers project downwardly at the outer edges of the end block 207 and have transverse jaw portions 214 to clinch the flanges 215 of the carton top T around the flanges 23 of the carton body B when said levers 212 are swung from the position of FIGURE 32 to that of FIGURE 33.

The upper ends of the levers 212 have rollers 216 which extend through slots 217 in the body 203 for coaction with the lower conical end 218 of a tubular plunger 219 which is slidably mounted in the body bore 205. The upper end of the plunger 219 has a head 220.

A pin 221 is slidably mounted in the plunger 219 and is biased downwardly by a spring 222 to the position shown in FIGURE 32, in which position it is spaced upwardly from the shank 210 of the pressure plate 209. When the plunger 219 is downwardly moved from the position of FIGURE 32 to that of FIGURE 33, the conical end 218 of said plunger acts on the rollers 216 to swing the levers 212 and cause the jaw portions 214 to clinch the flanges 215 of the carton top T around the body flanges 23. During this operation, the pin 221 acts downwardly on the shank 210 and thus moves the pressure plate 209 downwardly to tightly hold the flanges 23 and 215 and the top T together to assure that these elements shall be tightly secured together. In this connection, it will be recalled that the carton top T carries a thermo-plastic adhesive which is heated to tacky state by the heater 30 before said carton top is applied.

Springs 223 are provided to return the levers 212 to the position shown in FIGURE 32, upon upward return of the plunger 219. However, as a precaution, pull links 224 are pivoted to the levers 212 and have slot-and-pin connections 225 with the plunger head 220. Should the springs 223 of any lever break or fail to act, this lever will be returned after operation, by its respective link 224.

The operating means for the plunger 219 includes a transverse rock shaft 226 shown in FIGURES 1 and 2 in addition to FIGURES 31 to 33. This shaft 226 has arms 227 allotted one to each of the plungers 219 and each arm 227 is linked at 228 to its respective plunger. The shaft 226 is mounted in bearings 229 carried by the side plates 2 and 3: and one end of said shaft has an actuating arm 230 which is provided with a cam follower 231 engaging a cam 232 (FIGURE 2) on the continuously driven shaft 73 above described. Thus, the rotation of this shaft 73 is utilized to oscillate the rock shaft 226 and cause the required up and down movements of the plungers 219 to actuate the carton top applying jaw mechanisms 26.

The carton top feeding means 25 includes a swingable feed frame 233 (FIGURE 3 and FIGURES 31, 32 and 35). This feed frame 233 is suspended from the shaft 73 by means of bearings 234 on the upper end of said frame 233 and turnable on said shaft 73. The lower end of frame 233 carries a transverse bar 235 to which pairs of tines 236 are secured, said tines constituting top-feeding forks allotted one to each top applying jaw mechanism 26. The inner opposed edges of the tines 236 of each pair are formed with longitudinal grooves 237 into engagement with which two of the carton top flanges 215 are snapped when the feed frame 233 occupies the dotted position of FIGURE 31. As frame 233 is swung to the full-line position of FIGURE 31, the tines 236 position the carton top T between the carton body B at "Station 7" and the jaw mechanism 26. Then as the carton body B is upwardly projected, as above explained, it pushes the top T from engagement with the tine grooves 237 and disposes said top against the pressure plate 209 of the mechanism 26. This mechanism then acts to clinch the carton top onto the carton body as above explained. The feed frame 233 then returns to the dotted line position of FIGURE 31.

The operating means for the feed frame 233 includes a transverse rock shaft 238 (FIGURES 1 to 3 and FIGURES 31, 32 and 35). This rock shaft 238 has an arm 239 overhanging the frame 233 and linked thereto at 240. The rock shaft 238 is mounted in bearings carried by the side plates 2 and 3 and one end of said rock shaft 238 has an actuating arm 241 which is provided with a cam follower 242. This follower engages a cam 243 on the shaft 73. Thus the continuous rotation of this shaft 73 is utilized to swing the feed frame 233 from the carton top receiving position shown in dotted lines in FIGURE 31 to to the carton top placing position shown in full lines in this view.

For removing the carton tops T from the stacks in the hoppers 24 and engaging them with the tines 236, suction cups 244 are employed as seen in FIGURES 3, 31 and 38. The suction cups 244 are carried by arms 245 on a transverse rock shaft 246. The cups 244 are movable from the full line top-receiving position of FIGURE 31 to the dotted line delivery position of this view. As they approach this delivery position, they engage two of the carton top flanges 215 with the grooves 237 of the tines 236. Then, strippers 247 hold the carton tops while the suction cups 244 complete their movement. The tines 236 move the carton tops into the required position when the feed frame 233 is swung to the position shown in full lines in FIGURE 31.

For oscillating the rock shaft 246 as required, the means shown in FIGURES 3, 31 and 38, is employed. The rock shaft has an actuating arm 248 connected by a pitman 249 with a crank 250 on one end a short transverse shaft 251. This shaft is mounted in a bearing 252 carried by the side plate 3 and the outer end of said shaft has a sprocket 253. This sprocket is driven by a chain 254 and this chain is driven by a sprocket 255 on the continuously rotating shaft 73.

*Station 8 (See FIGURES 3, 4, 39 and 40)*

The ejecting means 28 for the completed cartons includes a carriage 256 reciprocably mounted on a transverse horizontal plate 257 the ends of which are secured to the side plates 2 and 3. Five ejecting arms 258 are secured to the carriage 256 and project toward the upper turret U in position to extend longitudinally of the pockets 11 at "Station 8." Each ejecting arm 258 has an ejecting finger 259 in position to abut the carton bottom as shown in FIGURE 39 when the carton arrives at "Station 8." When the carriage 256 is moved away from the turret U, the finger 259 travels in a slot 260 of the pocket 11 and the carton is thus ejected onto a plate 261 (FIGURE 3) which extends to the conveyor 27. The inner end of each pocket 11 has a throat 262 through which the ejecting finger 259 enters the pocket.

To operate the carriage 256 it is linked at 263 (FIGURES 3 and 18) to the bell crank 167 which forms part of the operating mechanism for the transfer means 20.

*Operation*

The operation of the machine will be readily understood from the explanation already given under the heading "General Explanation" and from the explanations given of the various sub-assemblies while describing them.

Attention is again invited to the fact that while the machine has been disclosed for simultaneously feeding five collapsed carton bodies from five stacks and for performing operations resulting in the completion of five cartons at a time, it is not restricted as to number. Moreover, it is to be understood that numerous variations could well be made within the scope of the invention.

I claim:

1. In a milk carton assembling machine, a first turret having a radial mandrel, means for intermittently driving said first turret to dispose said mandrel in different positions; a second turret having a radial pocket, means for intermittently driving said second turret to dispose said pocket in different positions; means for sliding an open-ended carton body onto said mandrel when said mandrel occupies a predetermined one of its positions, means for applying a carton bottom to the outer end of the mandrel-carried carton body when said mandrel occupies another predetermined one of its positions, transfer means for sliding the bottom-carrying carton body from said mandrel into said pocket when said mandrel occupies another predetermined one of its positions and said pocket occupies a predetermined one of its positions, means for applying a carton top to the outer end of the pocket-carried carton body when said pocket occupies another predetermined one of its positions, and means for removing the completed carton from said pocket when said pocket occupies another predetermined one of its positions.

2. In a milk carton assembling machine for use with diagonally-collapsed open-ended carton bodies, a first turret having a radial mandrel, means for intermittently driving said first turret to dispose said mandrel in different positions; a second turret having a radial pocket, means for intermittently driving said second turret to dispose said pocket in different positions; means for successively opening diagonally-collapsed open-ended carton bodies, means for simultaneously holding open and sliding one of the opened carton bodies onto said mandrel each time said mandrel occupies a predetermined one of its positions, means for applying a carton bottom to the outer end of the mandrel-carried carton body when said mandrel occupies another predetermined one of its positions, transfer means for sliding the bottom-carried carton body from said mandrel into said pocket when said mandrel occupies another predetermined one of its positions and said pocket occupies a predetermined one of its positions, means for applying a carton top to the pocket-carried carton body when said pocket occupies another predetermined one of its positions, and means for removing the completed carton from said pocket when said pocket occupies another predetermined one of its positions.

3. In a milk carton assembling machine, a first turret having a radial mandrel, means for intermittently driving said first turret to dispose said mandrel in different positions; a second turret having a radial pocket, means for intermittently driving said second turret to dispose said pocket in different positions; means for sliding an open-ended carton body onto said mandrel when said mandrel occupies a predetermined one of its positions, means for applying a carton bottom to the outer end of the mandrel-carried carton body when said mandrel occupies another predetermined one of its positions, transfer means for sliding the bottom-carrying carton body from said mandrel into said pocket when said mandrel occupies another predetermined one of its positions and said pocket occupies a predetermined one of its positions, means for preparing the outer end of the pocket-carried carton body for carton top reception while said pocket occupies another predetermined one of its positions, means for applying a carton top to the prepared end of the pocket-carried carton body when said pocket occupies another predetermined one of its positions, and means for removing the completed carton from said pocket when said pocket occupies another predetermined one of its positions.

4. In a milk carton assembling machine, a first turret having a radial mandrel, means for intermittently driving said first turret to dispose said mandrel in different positions; a second turret having a radial pocket, means for intermittently driving said second turret to dispose said pocket in different positions; means for sliding an open-ended carton body onto said mandrel when said mandrel occupies a predetermined one of its positions, means for applying a carton bottom to the outer end of the mandrel-carried carton body when said mandrel occupies another predetermined one of its positions, transfer means for sliding the bottom-carrying carton body from said mandrel into said pocket when said mandrel occupies another predetermined one of its positions and said pocket occupies a predetermined one of its positions, means for necking-in the outer end of the pocket-carried carton body when said pocket occupies another predetermined one of its positions, means for applying a carton top to the necked-in end of the pocket-carried carton body when said pocket occupies another predetermined one of its positions, and means for removing the completed carton from said pocket when said pocket occupies another predetermined one of its positions.

5. In a milk carton assembling machine, a first turret having a radial mandrel, means for intermittently driving said first turret to dispose said mandrel in different positions; a second turret having a radical pocket, means for intermittently driving said second turret to dispose said pocket in different position; means for sliding an open-ended carton body onto said mandrel when said mandrel occupies a predetermined one of its positions, means for applying a carton bottom to the outer end of the mandrel-carried carton body when said mandrel occupies another predetermined one of its positions, transfer means for sliding the bottom-carrying carton body from said mandrel into said pocket when said mandrel occupies another predetermined one of its positions and said pocket occupies a predetermined one of its positions, means for flanging the outer end of the pocket-carried carton body when said pocket occupies another predetermined one of its positions, means for clinching a carton top over the flanged end of the pocket-carried carton body when said pocket occupies another predetermined one of its positions, and means for removing the completed carton from said pocket when said pocket occupies another predetermined one of its positions.

6. In a milk carton assembling machine, a first turret having a radial mandrel, means for intermittently driving said first turret to dispose said mandrel in different positions; a second turret having a radial pocket, means for intermittently driving said second turret to dispose said pocket in different positions; means for sliding an open-ended carton body onto said mandrel when said mandrel occupies a predetermined one of its positions, means for applying a carton bottom to the outer end of the mandrel-carried carton body when said mandrel occupies another predetermined one of its positions, transfer means for sliding the bottom carrying carton body from said mandrel into said pocket when said mandrel occupies another predetermined one of its positions and said pocket occupies a predetermined one of its positions, means for necking-in and flanging the outer end of the pocket-carried carton body when said pocket occupies another predetermined one of its positions, means for clinching a carton top over the necked-in and flanged end of the pocket-carried carton body when said pocket occupies another predetermined one of its positions, and means for removing the completed carton from said pocket when said pocket occupies another predetermined one of its positions.

7. In a milk carton assembling machine, a lower turret having a group of radial mandrels spaced apart ninety degrees, means for intermittently driving said lower turret to successively present each of said mandrels in a first and horizontal position, then in a second and downwardly projecting position, then in a third and horizontal position and then in a fourth and upwardly projecting position, means for sliding an open-ended carton body onto each of said mandrels while it occupies said first and horizontal position, means for applying a carton bottom to the outer end of each mandrel-carried carton when its respective mandrel occupies said second and downwardly projecting position, an upper turret having a group of four radial pockets spaced apart ninety degrees, means for intermittently driving said upper turret to successively present each of said pockets in a first and downwardly projecting position in which it is vertically aligned with the subjacent upwardly projecting mandrel, then in a second and horizontal position, then in a third and upwardly projecting position and then in a fourth and horizontal position, transfer means for upwardly sliding each bottom-carrying carton body from its respective carrying mandrel when the latter occupies its upwardly projecting position, whereby the carton will enter the then downwardly projecting pocket of said upper turret, means for preparing the outer end of each pocket-carried carton body for the attachment of a carton top when the carrying pocket of this carton body occupies its second and horizontal position, means for applying a carton top to the outer prepared end of each pocket-carried carton body when the carrying pocket of this carton occupies its third and upwardly projecting position, and means for sliding each completed carton from its carrying pocket when this pocket occupies its fourth and horizontal position.

8. In a milk carton assembling machine, a lower turret having a group of radial mandrels spaced apart ninety degrees, means for intermittently driving said lower turret to successively present each of said mandrels in a first and horizontal position, then in a second and downwardly projecting position, then in a third and horizontal position and then in a fourth and upwardly projecting position, means for sliding an open-ended carton body onto each of said mandrels while it occupies said first and horizontal position, means for applying a carton bottom to the outer end of each mandrel-carried carton when its respective mandrel occupies said second and downwardly projecting position, an upper turret having a group of four radial pockets spaced apart ninety degrees, means for intermittently driving said upper turret to successively present each of said pockets in a first and downwardly projecting position in which it is vertically aligned with the subjacent upwardly projecting mandrel, then in a second and horizontal position, then in a third and upwardly projecting position and then in a fourth and horizontal position, transfer means for upwardly sliding each bottom-carrying carton body from its respective carrying mandrel when the latter occupies its upwardly projecting position, whereby the carton will enter the then downwardly projecting pocket of said upper turret, means for necking-in and flanging the outer end of each pocket-carried carton body when the carrying pocket of this carton body occupies its second and horizontal position, means for clinching a carton top onto the necked-in and flanged end of each carton body when the carrying pocket of this carton body occupies its third and upwardly projecting position, and means for sliding each completed carton from its carrying pocket when this pocket occupies its fourth and horizontal position.

9. A structure as specified in claim 7, in which the carton bodies are stacked in diagonally collapsed condition and in which means are provided to successively feed the collapsed carton bodies from the stack, open the carton bodies in readiness for sliding onto the mandrels, and hold the carton bodies open during the sliding thereof onto the mandrels.

10. In a milk carton assembling machine, a mandrel receivable in an open-ended carton body and movable to a downwardly projecting position to vertically position said open-ended carton body in readiness for the application of a carton bottom thereto, an upwardly cupped die with which said mandrel is aligned when in said downwardly projecting position, said die being dimensioned to receive the lower end of said mandrel and the lower end of the mandrel-carried carton body.

11. A structure as specified in claim 10, in which each of two opposite sides of said mandrel has a longitudinal groove in which to operate carton body removing members for sliding the carton body and attached bottom from said mandrel after movement of the latter to another position, two filler blocks retractably mounted in said mandrel at the outer ends of the two grooves respectively, said filler blocks having surfaces normally flush with said opposite sides of said mandrel and other surfaces normally flush with the lower end surface of said mandrel, and spring means for yieldably holding said filler blocks in their normal positions, said filler blocks having portions to be struck by the aforementioned carton body removing members to retract said filler blocks and prevent them from interfering with full movement of said members.

12. In a milk carton assembling machine, a lower turret having radial carton-body-carrying mandrels to successively occupy an upwardly projecting position, an upper turret having carton-body-receiving pockets to successively occupy a downwardly projecting position in alignment with the upwardly projecting mandrel, two spaced transfer arms between which said mandrels travel during movement to said upwardly projecting position, said transfer arms having inturned fingers on their free ends to upwardly thrust against the lower end of a carton body on the upwardly projecting mandrel, a vertically movable carriage upon which said transfer arms are mounted, and means for operating said carriage to lift said arms and thereby slide the carton body from the upwardly projecting mandrel into the downwardly projecting pocket, said mandrels having longitudinal grooves in which said fingers travel during movement of said transfer arms.

13. In a milk carton assembling machine, an intermittently driven turret having radial pockets to carry cartons having open ends projecting beyond the outer ends of said pockets, said pockets being mounted for radial projection beyond normal retracted positions, a jaw mechanism for shaping the outer ends of each pocket-carried carton in readiness for the application of a carton top thereto, means mounting said jaw mechanism stationarily with respect to the turret rotation and in position to clear the projecting end of each carton as this carton is presented by its respective pocket to a predetermined position in readiness for engagement with said jaw mechanism, pocket-shifting means for radially projecting said respective pocket to project the outer end of the carton into position to be operated upon by said jaw mechanism, and means for actuating said jaw mechanism to shape the carton end and for then restoring said jaw mechanism to inoperative position, said pocket-shifting means being then operable to return the pocket to its normal retracted position.

14. A structure as specified in claim 13, in which said jaw mechanism includes jaws operable to neck-in and outwardly flange the carton body end.

15. A structure as specified in claim 13, in which said turret includes a radially shiftable pocket-carrying member for each of said pockets, said pocket-carrying member having track followers spaced radially from the turret axis, two circular tracks concentric with said turret axis and engaged by said track followers respectively, each of said circular tracks including a fixed major section to hold the pocket-carrying member in retracted position toward the turret axis and a radially shiftable section for moving said pocket-carrying member away from said turret axis to project the pocket and back toward the turret axis to retract said pocket, and means connected with said shiftable track section for shifting the same.

16. A jaw mechanism for shaping the open end of a carton in readiness for the application of a carton top thereto, said mechanism comprising a fixed body having a die at its front end sized and shaped for snug reception in the end of the carton, said die having a substantially flat front face, four outer longitudinal arms pivotally mounted on the front end of said body, said outer arms having jaw portions at their front ends to abut the outer sides of the four carton walls, said jaw portions being shaped to neck-in and to flange the carton end when said arms are swung inwardly, four inner longitudinal arms pivotally mounted on the front end of said body, said inner arms having jaw portions to abut the inner sides of the four carton walls in opposed relation with the aforesaid jaw portions of said outer arms, and means for inwardly swinging said inner and outer arms to neck-in and flange the carton end and for then returning said inner and outer arms to their normal positions.

17. In a milk carton assembling machine, an intermittently driven turret having radial pockets to carry cartons having open flanged ends projecting beyond the outer ends of said pockets, said pockets being mounted for radial projection beyond normal retracted positions, a jaw mechanism for clinching a carton top to the flanged end of each carton body, means mounting said jaw mechanism stationarily with respect to the turret rotation and in position to clear the projecting end of each carton as this carton is presented by its respective pocket to a predetermined position in readiness for carton top application, means for feeding flanged carton tops from a stack and releasably holding one of said tops in position for application to the flanged end of the carton occupying said predetermined position, pocket-shifting means for then radially projecting the pocket carrying this carton to engage the flanged top with the flanged end of the carton and to dispose said flanged top in position to be acted upon by said jaw mechanism, and means for actuating said jaw mechanism to clinch the top flange means around the carton flange means and for then restoring said jaw mechanism to inoperative position, said carton-shifting means being then operable to return the pocket to its normal retracted position.

18. A structure as specified in claim 17, in which said turret includes a radially shiftable pocket-carrying member for each of said pockets, said pocket-carrying member having track followers spaced radially from the turret axis, two circular tracks concentric with said turret axis and engaged by said track followers respectively, each of said circular tracks including a fixed major section to hold the pocket-carrying member in retracted position toward the turret axis and a radially shiftable section for moving said pocket-carrying member away from said turret axis to project the pocket and back toward the turret axis to retract said pocket, and means connected with said shiftable track section for shifting the same.

19. A jaw mechanism for clinching a flanged carton top onto a flanged carton end, said mechanism comprising a fixed body, a pressure plate at the lower end of said body to contact with the upper side of the carton top, means mounting said pressure plate on said body for vertical movement, yieldable means for normally holding said pressure plate in a raised position, four flange-clinching jaws mounted on said lower end of said body in positions to engage the outer sides of the carton top flange means when the carton top abuts said pressure plate, jaw actuating means operable to inwardly move said jaws to clinch the cover flange means around the carton flange means and to later return said jaws to normal positions, said jaws having portions to underlie and contact with the clinched carton top flange means, and means for exerting downward pressure on said pressure plate while said jaw portions underlie and contact with said clinched cover flange means.

20. A structure as specified in claim 19, in which said jaw actuating means includes a plunger in said body and downwardly slidable to move said jaws to operative position, and in which said means for exerting downward pressure on said pressure plate comprises an upwardly yieldable spring-pressed plunger mounted in the lower end of the first named plunger, and in which said means for mounting said pressure plate includes a shank projecting upwardly from said pressure plate and slidable in the lower end of said body, said shank being in the downward path of said upwardly yieldable spring-pressed plunger to receive downward pressure therefrom.

21. In a milk carton assembling machine, means for upwardly moving a carton having a flanged upper end, means above said carton moving means for clinching opposed downwardly flared flanges of a carton top to the flanged carton end, a carton top feeding fork mounted for movement from a top-receiving position to a second position for disposing the carton top between said carton moving means and said clinching means, said fork having two tines substantially unidirectional with the line of fork movement and formed with longitudinal grooves in their inner sides to receive the free edges of the downwardly flared carton top flanges, means for feeding the carton top from a stack and upwardly moving it between said tines to snap the free edges of the top flanges into said grooves, means for freeing the carton top from said feeding means when its flanges are engaged with said grooves, and means for moving said fork to said second position, whereby upward movement of the carton will engage it with said top and push the latter from said fork to said clinching means.

22. In a carton assembling machine, including a turret having a radial pocket from which the completed carton must be removed when said pocket reaches a predetermined position; a reciprocably mounted ejector movable in a direction parallel to said pocket when the latter occupies said predetermined position, said ejector having a finger to thrust against the inner end of the carton and slide the latter from said pocket, said pocket having a longitudinal slot in which said finger is movable, and operating means for said ejector.

References Cited in the file of this patent

UNITED STATES PATENTS

| | | |
|---|---|---|
| 2,085,017 | Funkhouser et al. | June 29, 1937 |
| 2,200,276 | Hothersall et al. | May 14, 1940 |
| 2,251,883 | Hartmann | Aug. 5, 1941 |
| 2,399,250 | Peters | Apr. 30, 1946 |
| 2,642,784 | Wittkuhns et al. | June 23, 1953 |
| 2,671,385 | Johenning et al. | Mar. 9, 1954 |
| 2,802,407 | Majer | Aug. 13, 1957 |
| 2,887,933 | Bergstein et al. | May 26, 1959 |